United States Patent
Mehrotra et al.

(10) Patent No.: US 11,561,535 B2
(45) Date of Patent: Jan. 24, 2023

(54) SYSTEMS AND METHODS FOR DATA LIFECYCLE MANAGEMENT WITH CODE CONTENT OPTIMIZATION AND SERVICING

(71) Applicant: Rockwell Automation Technologies, Inc., Mayfield Heights, OH (US)

(72) Inventors: Abhishek Mehrotra, New Berlin, WI (US); Steven P. Taylor, Madison, WI (US); Braun C. Brennecke, Pittsburgh, PA (US); Evan J. Kausalik, Appleton, WI (US); John D. Mayer, Lakewood, OH (US); Tyler C. Tamburlin, Painesville, OH (US); Richard S. Turk, Highland Heights, OH (US); Timothy R. Brennan, Bayside, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 177 days.

(21) Appl. No.: 17/038,450

(22) Filed: Sep. 30, 2020

(65) Prior Publication Data

US 2022/0100182 A1   Mar. 31, 2022

(51) Int. Cl.
  *G06F 11/34* (2006.01)
  *G05B 19/418* (2006.01)

(52) U.S. Cl.
  CPC ... *G05B 19/41885* (2013.01); *G05B 19/4183* (2013.01); *G05B 19/4185* (2013.01); *G05B 19/41865* (2013.01); *G06F 11/3457* (2013.01)

(58) Field of Classification Search
  CPC .......... G05B 19/41885; G05B 19/4183; G05B 19/4185; G05B 19/41865;
  (Continued)

(56) References Cited

U.S. PATENT DOCUMENTS 10,970,316 B1 *   4/2021   Khan .................... G06F 16/221
2004/0139085 A1 *   7/2004   Eryurek ............... G05B 19/418
(Continued)

FOREIGN PATENT DOCUMENTS

EP   3696622 A1   8/2020
EP   3709227 A1   9/2020
WO   2020040772 A1   2/2020

OTHER PUBLICATIONS

Pokhrel et al. "Digital Twin for Cybersecurity Incident Prediction: A Multivocal Literature Review" 2020 IEEE/ACM 42nd International Conference on Software Engineering Workshops (ICSEW) (Published Sep. 25, 2020) [retrieved on May 20, 2022] (Year: 2020).*

(Continued)

*Primary Examiner* — Rehana Perveen
*Assistant Examiner* — Alfred H B Wechselberger
(74) *Attorney, Agent, or Firm* — Fletcher Yoder, PC

(57) ABSTRACT

A non-transitory computer-readable medium includes instructions that, when executed, cause one or more processors to perform operations. The operations include receiving a first request to access a digital representation that is assigned to an asset of an industrial automation system and includes code specific to operating, maintaining, or diagnosing the asset. The operations also include verifying a security access for the first request, providing the computing device access to the digital representation, receiving an input to modify the code from the computing device and, performing one or more simulations based on the modified code by utilizing the digital representation. Additionally, the operations include sending one or more simulation results to the computing device, receiving, from the computing device, a second request for pushing the modified code to the (Continued)

asset, and in response to receiving the second request, causing the modified code to be sent to the asset.

20 Claims, 15 Drawing Sheets

(58) Field of Classification Search
CPC ........... G05B 2219/24168; G05B 2219/32356; G05B 17/02; G05B 19/0426; G05B 19/4184; G06F 11/3457; G06F 2221/2141; G06F 21/57; H04L 63/1433; H04L 67/12; H04L 67/125; H04L 67/01
See application file for complete search history.

(56) References Cited

U.S. PATENT DOCUMENTS

| | | |
|---|---|---|
| 2015/0316904 A1 | 11/2015 | Govindaraj et al. |
| 2016/0333855 A1 | 11/2016 | Lund et al. |
| 2017/0242935 A1* | 8/2017 | Wragg ............... G05B 19/0423 |
| 2018/0300437 A1* | 10/2018 | Thomsen .......... G06F 16/24573 |
| 2019/0138970 A1* | 5/2019 | Deutsch ................. G06F 9/542 |
| 2021/0096975 A1* | 4/2021 | DeLuca ................ G06F 11/301 |
| 2021/0141778 A1* | 5/2021 | Madden ............... G06F 3/0484 |

OTHER PUBLICATIONS

El Kaed et al. "Linking an Asset and a Domain Specific Ontology for a Simple Asset TimeSeries Application" 2018 IEEE International Conference on Big Data (Big Data) [retrieved on Sep. 10, 2022] (Year: 2018).*
European Search Report for European Application No. 21186962.3, dated Jan. 24, 2022, 15 Pages.
European Search Report for European Application No. 21186962.3, dated Mar. 9, 2022, 16 Pages.
Dietz et al., "A Distributed Ledger Approach to Digital Twin Secure Data Sharing", International Federation for Information Processing 2019, Jun. 11, 2019, pp. 281-300, Springer Switzerland AG 2019.
Talkhestani et al., "An architecture of an Intelligent Digital Twin in a Cyber-Physical Production System", Automatisierungstechnik 2019, Mar. 19, 2019, pp. 762-782, vol. 67, No. 9, De Gruyter Oldenbourg, https://www.degruyter.com/document/doi/10.1515/auto-2019-0039/html>.

* cited by examiner

SYSTEMS AND METHODS FOR DATA LIFECYCLE MANAGEMENT WITH CODE CONTENT OPTIMIZATION AND SERVICING

BACKGROUND

The present disclosure generally relates to asset-related data management with code optimization and servicing. More specifically, the present disclosure relates to systems and methods for enabling users to have secure access to certain data (e.g., code) associated with various assets within an industrial automation system and optimizing the code by utilizing virtual instances (e.g., Digital Twins) of the assets and simulations.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Service technicians that provide various services associated with an industrial automation system owned or operating by one entity may be employed by a separate entity, such as a company that provides maintenance services, diagnostic services, security services, or other services to the entity that operates that industrial automation system. Because the service technicians may work for a separate entity, information associated with various components of the industrial automation system, as well as other information (e.g., code, firmware), may not be accessible to the service technicians. Accordingly, maintaining an accurate list or version of information (e.g., code, firmware) related to equipment or different components in the industrial automation system may assist technicians in effectively servicing the related equipment or components. However, even if the information is available to the service technicians, the information may not provide sufficient context to enable the technicians to resolve or diagnose errors or potential errors associated with the components or information (e.g., errors in code).

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a non-transitory computer-readable medium is provided. The medium includes instructions that, when executed, cause one or more processors to perform operations. The operations include receiving, from a computing device, a first request to access a digital representation that is assigned to an asset of an industrial automation system and includes code specific to operating, maintaining, or diagnosing the asset, verifying a security access for the first request based on identity information associated with a user of the computing device included in the first request to determine whether to provide the computing device access to the digital representation, and in response to verifying the security access, providing the computing device access to the digital representation. The operations also include receiving an input to modify the code from the computing device and, in response to receiving the input to change the code, performing one or more simulations based on the modified code by utilizing the digital representation. Additionally, the operations include sending one or more simulation results to the computing device for evaluations based on the one or more simulations, receiving, from the computing device, a second request for pushing the modified code to the asset, and in response to receiving the second request, causing the modified code to be sent to the asset.

In another embodiment, a system is provided. The system includes one or more processors configured to simulate a performance of each asset of a plurality of assets in a computational environment by running one or more simulations of a performance of each asset of the plurality of assets using a plurality of digital representations corresponding to the plurality of assets stored in a code repository. The code repository includes multiple portions of computer-executable code, each of which is used to operate a respective asset. The code repository also includes multiple digital representations, each of which represents an asset in a computational environment and is generated based on a respective portion of computer-executable code associated with the respective asset. The one or more processors are also configured to generate one or more updated portions corresponding to one of more portions of computer-executable code and send the one or more updated portions to one or more assets associated with the one or more portions of computer-executable code.

In yet another embodiment, a method is provided. In accordance with this method, a processor receives a first request from a computing device for creating a digital representation for an asset in a code repository system of an industrial automation control system. In response to receiving the first request, the processor retrieves model code from the code repository system. The model code is associated with a first hierarchy that includes hierarchical levels of multiple digital representations corresponding to multiple assets of an industrial automation system. The processor then sends a second request to the asset for asset code associated with a second hierarchy that includes hierarchical levels of the multiple assets within the industrial automation system. In response to the second request, the asset sends the asset code to the processor. Next, the processor determines a mapping between the second hierarchy and the first hierarchy and converts the asset code to a reference code based on the mapping. Next, the processor generates an updated model code based on the reference code and creates the digital representation based on the updated model code.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
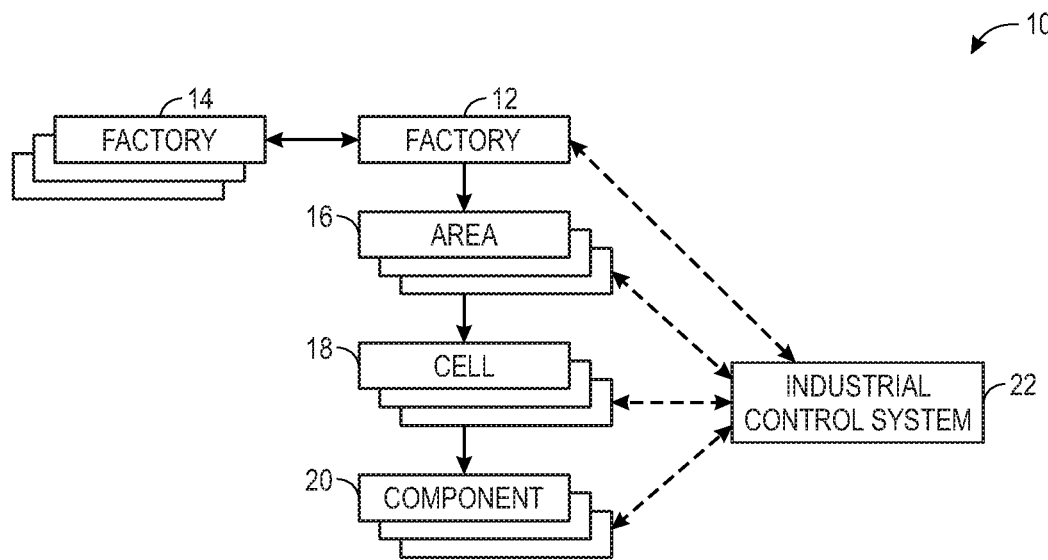
FIG. 1 illustrates a block diagram representing example hierarchical levels of an industrial automation system, in accordance with an embodiment presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed towards an industrial automation system that may employ a number of industrial automation components to perform various industrial processes. In one embodiment, each of the industrial automation components may be capable of connecting to an industrial automation network that may facilitate communication between the connected industrial automation components and one or more remote systems or devices (e.g., an industrial component management system or devices communicatively coupled to the industrial component management system). Data related to the industrial automation system may be communicated throughout the industrial automation network using a common data pipeline. For example, data generated from operations of the industrial automation components may be combined in a common data packet or protocol that is transmitted via the common data pipeline. In one embodiment, the industrial automation network may be operated by a different entity than the industrial automation system. The industrial automation network may include any wired or wireless network that may be implemented as a local area network (LAN), a wide area network (WAN), and the like. The Digital Twin may be used as a data framework to run various analytical algorithms and machine learning (ML) models to generate insights (e.g., for performance evaluation, diagnosis, or troubleshooting) and predictions (e.g., predicting cybersecurity threats).

In one embodiment, the industrial automation network may include an asset management system to remotely monitor, control, support, and maintain operations of a variety of assets. The assets may include tangible assets (e.g., industrial automation components, other devices, or equipment included in an industrial automation system) and intangible assets (e.g., workflows, procedures, and processes related to operating the tangible assets). In certain situations, the asset management system may create a number of Digital Twins each representing a corresponding asset in the industrial automation network. The asset management system may enable users (e.g., clients) to utilize the Digital Twins to remotely (e.g., via the industrial automation network) monitor, control, support, and maintain the operations of the corresponding assets. For example, the asset management system may allow a user (e.g. a technician) to have access to certain code (e.g., operational code, maintenance code, troubleshooting code, and firmware) associated with an asset that may have issues or errors. The user may use accessed code to identify an existing Digital Twin that has been assigned to the asset or to create a Digital Twin and assign the Digital Twin to the asset. The client may use/supervise the Digital Twin uniquely assigned to the asset to analyze the collected asset-related data, conduct simulations using a simulator coordinated with the Digital Twin, run diagnostics on and/or troubleshoot the asset-related data to determine one or more causes of respective issues or errors (e.g., based on data analysis and simulations), and update the code to enable appropriate solutions to the issues and errors.

In one embodiment, the industrial automation network may use certain electronic devices to enable microservices to facilitate data transmissions and improve data security in the industrial automation system and the industrial automation network. For example, the industrial automation network may enable connected microservices using certain edge devices and receiving devices to facilitate data transmissions associated with the asset-related data and add enhanced protections to improve data security during data transmissions. The connected microservices (e.g., programmed applications, consumers) may receive unclassified datasets from the edge devices and the industrial automation network. The connected microservices may include analytical software that acts as a router and/or a subscription service. The connected microservices may analyze the dataset to determine a category or classification for the dataset for use in the industrial automation network. For example, the connected microservices may route the dataset to a final location (e.g., the receiving devices) based on the analysis, route the dataset to different programmed applications, segment the dataset for storage and use, or perform some other suitable operation on the dataset based on the determined category or classification. The connected microservices may include programming structures that provision an overall software application (e.g., overall mapping/routing application of the industrial automation network) via a collection of the various configuration files (e.g., the connected microservice configuration file defining an analytical function of the connected microservice). The connected microservices may operate as a collection of generally coupled smaller software applications that when combined together perform the function of the overall software application.

By way of introduction, FIG. 1 depicts a block diagram of an example of hierarchical levels that may represent an industrial automation system 10. The industrial automation system 10 may be any system in the material handling, packaging industries, manufacturing, processing, batch processing, or any technical field that employs the use of one or more industrial automation components. In one embodiment, the industrial automation system 10 may include a factory 12 that may encompass part of the entire industrial automation system 10. As such, the industrial automation system 10 may include additional factories 14 that may be employed with the factory 12 to perform an industrial automation process or the like.

Each factory 12 (or factory 14) may be divided into a number of areas 16, which may, for example, include different production processes that use different types of industrial automation components. In one example, one area 16 may include a sub-assembly production process and another area 16 may include a core production process. In another example, each area 16 may be related to a different operation being performed in the manufacturing process. For instance, in a jelly bean manufacturing system, the areas 16 may include a jelly bean making area, a packaging area, a water filtration area, and the like. In yet another example, the area may include a production line in which a particular industrial process may be performed. Referring back to the jelly bean manufacturing system example, the production line may include a cooking line in which the jelly beans may be created, a sorting line where the jelly beans may be sorted according to a respective flavor, and a packaging line where the sorted jelly beans may be packaged into boxes or the like.

The area 16 may also be associated with physical locations of a number of industrial automation components 20 with respect to the industrial automation system 10. The areas 16 may also be related to different discipline areas of the industrial automation system 10, such as batch operation areas, continuous operation areas, discrete operation areas, inventory operation areas, and the like.

The areas 16 may be subdivided into smaller units, or cells 18, which may be further subdivided into corresponding industrial automation components 20. Using the example described above, the sub-assembly production process area 16 may be subdivided into cells 18 that may denote a particular group of industrial automation components 20 that may be used to perform one aspect of the sub-assembly production process. As such, the cell 18 may include a portion of the area 16 such as first part of a production line. The cell 18 may also include different parts of a particular procedure.

These cells 18 may then be further subdivided into corresponding industrial automation components 20, which may correspond to individual industrial automation components, such as controllers, input/output (I/O) modules, motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. Although the factory 12, the factories 14, the areas 16, and the cells 18 are termed as factories, areas, and cells, it should be noted that in various industries these groupings may be referred to differently in different industries or the like. For instance, the groupings may be termed as units, areas, sites, and the like.

The industrial automation components 20 may also be related to various industrial equipment such as mixers, machine conveyors, tanks, skids, specialized original equipment manufacturer machines, and the like. The industrial automation components 20 may also be associated with devices used by the equipment such as scanners, gauges, valves, flow meters, and the like. In one embodiment, every aspect of the component 20 may be controlled or operated by a single controller (e.g., control system). In another embodiment, the control and operation of each aspect of the component 20 may be distributed via multiple controllers (e.g., control systems).

The industrial automation components 20 may be used within the corresponding cell 18, area 16, or factory 12 to perform various operations for the respective cell 18, area 16, or factory 12. In certain embodiments, the industrial automation components 20 may be communicatively coupled to each other, to an industrial control system 22, or the like. Additionally, the industrial control system 22 may also be communicatively coupled to one or more control systems that may monitor and/or control the operations of each respective cell 18, area 16, or factory 12.

As such, the industrial control system 22 may be a computing device that may include communication abilities, processing abilities, and the like. For example, the industrial control system 22 may be a controller, such as a programmable logic controller (PLC), a programmable automation controller (PAC), or any other controller that may monitor, control, and operate an industrial automation device or component. The industrial control system 22 may be incorporated into any physical device (e.g., the industrial automation components 20) or may be implemented as a stand-alone computing device (e.g., general purpose computer), such as a desktop computer, a laptop computer, a tablet computer, a mobile device computing device, or the like.

In certain embodiments, the industrial control system 22 may be implemented within devices that enable the industrial automation components 20 to connect and communicate with each other. For instance, the industrial control system 22 may be implemented within network routers and/or switches. The network routers and/or switches may be located at a boundary of a network (e.g., cloud), serving as edge devices that control data flow at the boundary of the network. In this manner, the network routers and/or switches may host the industrial control system 22 that may be used to control and operate the industrial automation components 20 that may be communicatively coupled to the respective network router and/or switch. Since network routers and/or switches may serve as a hub for data transfers between the industrial automation components 20, the industrial control system 22 embedded within the routers/and or switches may be strategically positioned within a data network to have access or receive data associated with various industrial automation components 20. As such, the industrial control system 22 may perform various types of analyses on the received data and may then control and operate the respective industrial automation components 20 more efficiently or effectively based on the results of the analyses.

In addition to the physical devices mentioned above, the industrial control system 22 may include a software-based emulation of any of the aforementioned physical devices. For example, the industrial control system 22 may be implemented as software modules that may perform similar operations as certain hardware controllers, devices, and the like. As such, the industrial control system 22 may create virtual instances of the hardware components (e.g., controllers, I/O modules). That is, the industrial control system 22 may create digital representations (e.g., Digital Twins) for corresponding hardware components. These virtual instances may provide more flexible ways in which the industrial control system 22 may be implemented to monitor and control the industrial automation components 20.

In one embodiment, the industrial control system 22 may be implemented virtually in a cloud-accessible platform (i.e., cloud-computing system), one or more servers, in various computing devices (e.g., general purpose computers), and the like. As such, the industrial control system 22 may operate as a soft controller or as a control engine running in the cloud-computing system. By virtually implementing the industrial control system 22 in a cloud-computing system, the industrial control system may use a distributed computing architecture to perform various analyses and control operations. As more data associated with the industrial automation components 20, the cells 18, the areas 16, and the factories 14 become available, the distributed computing architecture in the cloud-computing system may enable data analysis to be performed more efficiently. That is, since the cloud-computing system may incorporate numerous computing systems and processors to perform the data analysis, the results of the analysis may be available more quickly. In this way, the respective operations of the industrial automation components 20, the cells 18, the areas 16, and the factories 14 may be controlled in real-time or near real-time.

Keeping the foregoing in mind, it should be understood that the industrial control system 22, as mentioned throughout this disclosure, may be implemented as physical components and/or virtual components (i.e., software-based) used to monitor and/or operate the industrial automation components 20, the cells 18, the areas 16, and the factories 14. Moreover, by providing the ability to incorporate the industrial control system 22 into various types of environments, the industrial automation system 10 may be well suited to expand and grow with the addition of new industrial automation components 20.

Figure 2:
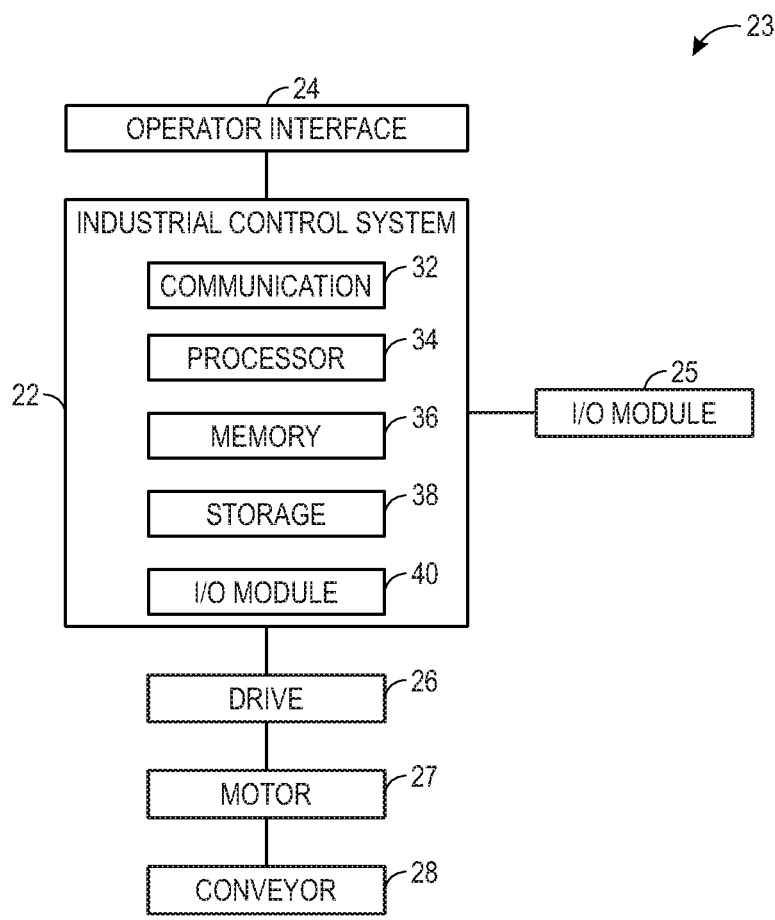
FIG. 2 illustrates a block diagram of an example control system that may be employed within the industrial automation system of FIG. 1, in accordance with an embodiment presented herein.

FIG. 2 illustrates an example control system 23 that may be employed with the industrial control system 22. As shown in FIG. 2, the industrial control system 22 may be communicatively coupled to an operator interface 24, which may be used to modify and/or view the settings and operations of the industrial control system 22. The operator interface 24 may be a user interface that may include a display and an input device used to communicate with the industrial control system 22. The display may be used to display various images generated by industrial control system 22, such as a graphical user interface (GUI) for operating the industrial control system 22. The display may be any suitable type of display, such as a liquid crystal display (LCD), plasma display, or an organic light emitting diode (OLED) display, for example. Additionally, in one embodiment, the display may be provided in conjunction with a touch-sensitive mechanism (e.g., a touch screen) that may function as part of a control interface for the industrial control system 22. In some embodiments, the operator interface 24 may be characterized as a human-machine interface, a human-interface machine, or the like.

The industrial control system 22 may also be communicatively coupled to input/output (I/O) modules 25. The I/O modules 25 may enable the industrial control system 22 to communicate with various devices in the industrial automation system. Moreover, the I/O modules 25 may enable the industrial control system 22 to receive information from the various devices, such that the information may provide reference points and other details regarding the industrial automation system to assist the industrial control system 22 to become aware of the environment in which the industrial control system 22 may be operating.

Generally, the industrial control system 22 may also be communicatively coupled to a certain device that may be used to control or manage the operation of the industrial automation system. For instance, in one embodiment, the industrial control system 22 may be coupled to a drive 26. The drive 26 may be an electrical drive that may convert an input alternating current (AC) voltage into a controllable AC voltage using a rectifier circuit and an inverter circuit. The industrial control system 22, in one embodiment, may be a controller that may control the operation of the drive 26. The drive 26 may be coupled to a motor 27, which may operate a component such as a conveyor 28 or the like. In one embodiment, the industrial control system 22 may be communicatively coupled to the operator interface 24, the I/O module 25, the drive 26, or the like via a communication network such as EtherNet/IP, ControlNet, DeviceNet, or any other industrial communication network protocol.

Keeping the example control system 23 in mind and referring to FIG. 1, the drive 26, the motor 27, and the conveyor 28 may each be considered to be a single component 20. However, the drive 26, the motor 27, and the conveyor 28 may also be considered to be a part of a particular cell 18, area 16, and factory 12. Accordingly, the industrial control system 22 may have the ability to adjust the operation of the component 20, the cell 18, the area 16, and the factory 12. For example, by adjusting the operation of the drive 26, the industrial control system 22 may adjust the operation of the motor 27 and the conveyor 28. Consequently, the industrial control system 22 may adjust the operation of the cell 18, the area 16, and the factory 12 having the conveyor 28 as a component. By understanding how each component 20 may be related to the industrial automation system 10 with respect to each area 16, each cell 18, and each component 20, the industrial control system 22 may begin to become capable to manage the operations (e.g., production, energy usage, equipment lifecycle) of the industrial automation system 10 more efficiently.

As mentioned above, the industrial control system 22 may be a controller or any computing device that may include communication abilities, processing abilities, and the like. As illustrated, the industrial control system 22 may include a communication component 32, a processor 34, a memory 36, a storage 38, input/output (I/O) ports 40, and the like. The communication component 32 may be a wireless or wired communication component that may facilitate communication between the industrial automation components 20, the control systems for the factory 12, the area 16, the cell 18, and the like. The processor 34 may be any type of computer processor or microprocessor capable of executing computer-executable code. The processor 34 may also include multiple processors that may perform the operations described below. The memory 36 and the storage 38 may be any suitable articles of manufacture that can serve as media to store processor-executable code, data, or the like. These articles of manufacture may represent computer-readable media (i.e., any suitable form of memory or storage) that may store the processor-executable code used by the processor 34 to perform the presently disclosed techniques. The memory 36 and the storage 38 may also be used to store the data, analysis of the data, and the like. The memory 36 and the storage 38 may represent non-transitory computer-readable media (i.e., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to the I/O modules 25 discussed above. Although the above-mentioned components are depicted with respect to the industrial control system 22, it should be noted that the control system for the factory 12, the area 16, the cell 18, and the like may also include the same or similar components to perform the various techniques described herein.

Keeping the foregoing in mind, the industrial control system 22 may use the communication component 32 to communicatively couple to one or more control systems. The industrial control system 22 may also monitor and/or control the operations of each respective component 20, cell 18, area 16, or factory 12. For example, the control system 22 may receive data from a variety of assets (e.g., the industrial automation components 20, and/or workflows, procedures, and processes related to operating the industrial automation components 20) that may be located in the factory 12, the areas 16, or the cells 18. In one embodiment, the industrial control system 22 or a control system for each area 16, cell 18, or component 20 may receive information related to how the industrial automation system 10 may be subdivided, how each area 16, cell 18, and component 20 may interact with each other, which industrial automation components 20 are part of each factory 12, area 16, or cell 18, or the like. For example, each area 16 may be related to a particular process of a manufacturing process. As such, the information received by the respective control system may detail which processes performed in certain areas 16 may depend on other processes being completed in other areas 16.

In certain embodiments, the respective control system may determine how each component 20 may relate to a respective cell 18 or area 16 based on data received from each respective component 20. For instance, a control system of a first component 20 may receive data from multiple other industrial automation components 20, such as a motor for a conveyer belt and a compressor for some industrial automation device. Upon receiving the data from a second component 20 that corresponds to the motor for the conveyer belt, the control system of the first component 20 may determine that the second component 20 is associated with some cell 18, which may be part of some area 16, based on a speed in which the motor may be operating. That is, the control system of the first component 20 may refer to information, such as system design parameters for the industrial automation system 10, and determine where the motor is located by identifying a motor with operating parameters, as specified by the system design parameters, having a substantially similar speed as the received speed. In certain embodiments, the speed at which the motor may be operating may not be sufficient to identify a particular motor if other motors in the industrial automation system 10 are operating at the same speed. As such, the control system may identify a motor by monitoring a speed profile (i.e., speed curve over time) of each motor in the industrial automation system 10. Additional ways in which a control system may identify particular industrial automation components 20 may include monitoring an operating mode (e.g., running/stopped/paused) of each component 20, examining network related information (e.g. IP addresses, MAC addresses, sub-net masks, or a combination of any of these, etc.) associated with each component 20, monitoring operating temperatures of each component 20 if available (e.g., industrial automation components 20 in certain cells 18 are exposed to more heat/cold than others cells 18), monitoring energy consumption data associated with each component (e.g., larger drives could be part of and used in certain cells 18 while smaller drives are used in other cells 18), and so forth.

Figure 3:
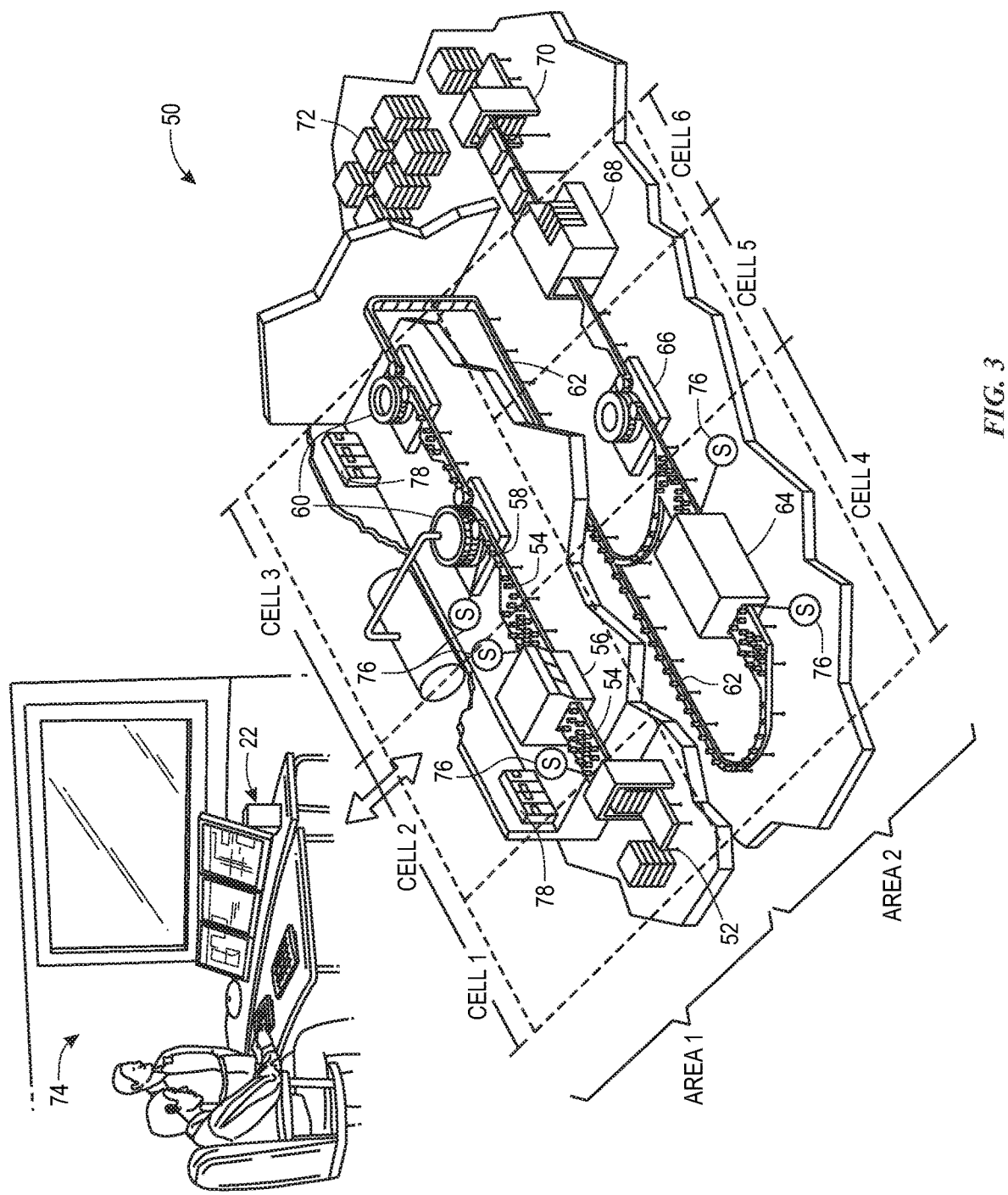
FIG. 3 illustrates an example of the industrial control system of the industrial automation system of FIG. 1, in accordance with an embodiment presented herein.

In any case, after analyzing the data associated with each component 20, the control system of the first component 20 may determine its relationship with other industrial automation components 20 of the industrial automation system with respect to the various scopes or hierarchical levels of the industrial automation system 10. By understanding the relationship to other industrial automation components 20 with respect to various scopes of the industrial automation system 10, the control system of the first component 20 may become aware of conditions occurring in processes, areas 16, or cells 18 that may directly or indirectly affect the operations of the first component 20. As such, the control system of the first component 20 may adjust its operations and send commands to other industrial automation components 20 to adjust their respective operations to compensate or minimize negative consequences that may occur due to the conditions in the areas 16, the cells 18, or the like. For example, production capacity of upstream or downstream cells being automatically adjusted by control systems in the respective cells by monitoring production levels of the cells adjacent to or related to the respective control system. As a result, the control systems may optimize production of the industrial automation system 10 by reducing the effects of bottlenecks cells that may lead to over or under production. In another example, sections of a conveyor used to transport materials may start adjusting their respective speeds based on other sections of the conveyor or production variances associated with the area 16, the cells 18, or the entire factory 12. In yet another example, the control system of the first component 20 may take into account energy consumption data associated with a second component to adjust the operation of the first component 20 (e.g. go to a lower energy consumption mode to maintain overall consumption constant, etc.). Additionally, after each component 20 becomes aware of the presence or existence of another component 20, some of the industrial automation components 20 may negotiate and determine an optimal production rates for each component 20 based on pre-determined criteria such as energy consumption/rates, production mix, production levels, and the like. Keeping the foregoing in mind, an example industrial automation system 10 of a packaging factory 50 and how the packaging factory 50 may be divided and sub-divided into areas 16 and cells 18 are depicted in FIG. 3. As illustrated in FIG. 3, the packaging factory 50 may represent an exemplary high-speed packaging line that may be employed in the food and beverage industry that may process beverage containers (i.e., a beverage line). As such, the packaging factory 50 may include industrial automation components that, for example, may enable machine components to fill, label, package, or palletize containers. The packaging factory 50 may also include one or more conveyor sections that may transport, align, or buffer containers between the machine components. Although FIG. 3 illustrates a packaging factory, it should be noted that the embodiments described herein are not limited for use with a packaging factory. Instead, it should be understood that the embodiments described herein may be employed in any industrial automation environment.

As illustrated in FIG. 3, the packaging factory 50 may include machine components configured to conduct a particular function with respect the beverage packaging process. For example, the beverage packaging process begins at a loading station 52, where pallets of empty cans or bottles to be filled are fed into packaging factory 50 via a conveyor section 54. The conveyor section 54 transports the empty cans from the loading station 52 to a washing station 56, where the empty cans and bottles are washed and prepared for filling. As the washed cans and bottles exit the washing station 56, the conveyor section 54 may gradually transition into an aligning conveyor section 58, such that the washed cans and bottles enter a filling and sealing station 60 in a single-file line.

The filling and sealing station 60 may function at an optimal rate when the washed cans and bottles enter the filling and sealing station 60 in a steady, uniform stream. However, if the transition between the conveyor section 54 and the aligning conveyor section 58 is erratic or faster than desired, the filling and sealing station 60 may not function at an optimal rate. As such, optimizing performance parameters (e.g., speed, size, function, position/arrangement or quantity) of the conveyor sections (i.e., conveyor section 54 or aligning conveyor section 58) may be beneficial to the efficiency of the packaging factory 50.

As the sealed cans exit the filling and sealing station 60, a buffering conveyor section 62 may hold the sealed cans to delay their entry into the next station. In addition, the buffering conveyor section 62 may transport the sealed cans in a single-file line so that the sealed cans arrive at a sterilization station 64 or a labeling station 66 at a desired time with the desired quantity of cans. Similar to the filling and sealing station 60, the packaging station 64 or the labeling station 66 functions efficiently when the buffering conveyor section 62 operates at optimal performance parameters (e.g., optimal speed, size, function, position/arrangement or quantity). After the cans and bottles have been sterilized and/or labeled, they are packaged into cases (e.g., 6-pack, 24-pack, etc.) at a packaging station 68, before they are palletized for transport at station 70 or stored in a warehouse 72. Clearly, for other applications, the particular system components, the conveyors and their function will be different and specially adapted to the application.

The packaging factory 50 may also include the industrial control system 22, which may be located in a control room 74 or the like. The industrial control system 22 may be coupled to one or more sensors 76, which may monitor various aspects of the machine components or conveyor sections of the packaging factory 50. The sensors 76 may include any type of sensor, such as a pressure sensor, an accelerometer, a heat sensor, a motion sensor, a voltage sensor, and the like. The sensors 76 may be located in various positions within the packaging factory 50, and may measure a parameter value of interest relating to the beverage packaging process during the operation of the packaging factory 50. For example, in certain embodiments, the sensors 76 may include sensors configured to measure the rate of bottles or containers per minute (BPM) entering or leaving a machine component (i.e., stations 54, 56, 58, 64, 66, 68 or 70), or the rate of accumulation of bottles on a portion of a conveyor section (e.g., conveyor section 54 or 62). In general, any sensors 76 capable of measuring a parameter value of interest relating to the beverage packaging process of the packaging factory 50 (e.g., rate, pressure, speed, accumulation, density, distance, position/arrangement, quantity, size, and so forth) may be used.

In some embodiments, the packaging factory 50 may include a number of industrial automation power components 78 that may be used to control power used by various machine components in the packaging factory 50. The power components 78 may include devices, such as drives, motors, inverters, switch gear, and the like, which may be used to operate a corresponding machine component. For example, the conveyor section 54 may rotate using a motor, which may be controlled via a power component 78, such as a variable frequency drive.

The power component 78 may include a control system that may monitor and control the operations of the respective power component 78. As such, the power component 78 may correspond to the component 20 described above with respect to FIG. 1. Referring back to the example above, the control system of the power component 78, such as the drive used to control the motor rotating the conveyor section 54, may monitor a voltage provided to the motor and may determine the speed at which the conveyor section 54 may be moving. In one embodiment, the control system of the power component 78 may send the data related to the speed at which the conveyor section 54 may be moving to the industrial control system 22 or to other control systems that may control other industrial automation components 20. In this manner, the industrial control system 22 or other control systems may be aware of the operations of the power component 78 and may account for these operations when determining how its respective component should operate.

Keeping the packaging factory 50 of FIG. 3 in mind, the industrial control system 22 may receive data from multiple power components 78 dispersed throughout the packaging factory 50. The industrial control system 22 may then contextualize the received data with respect to different scopes or hierarchical levels as described above with reference to FIG. 1.

In one embodiment, the scopes of the packaging factory 50 may be categorized based on functions of the components 20 and the cells 18 of the packaging factory 50. For instance, referring to both FIGS. 3 and 4, the loading station 52 may be categorized as cell 1, the washing station 56 may be categorized as cell 2, the sealing station 60 may be categorized as cell 3, the sterilization station 64 may be categorized as cell 4, the labeling station may be categorized as cell 5 and the packaging station 68 may be categorized as cell 6.

Figure 4:
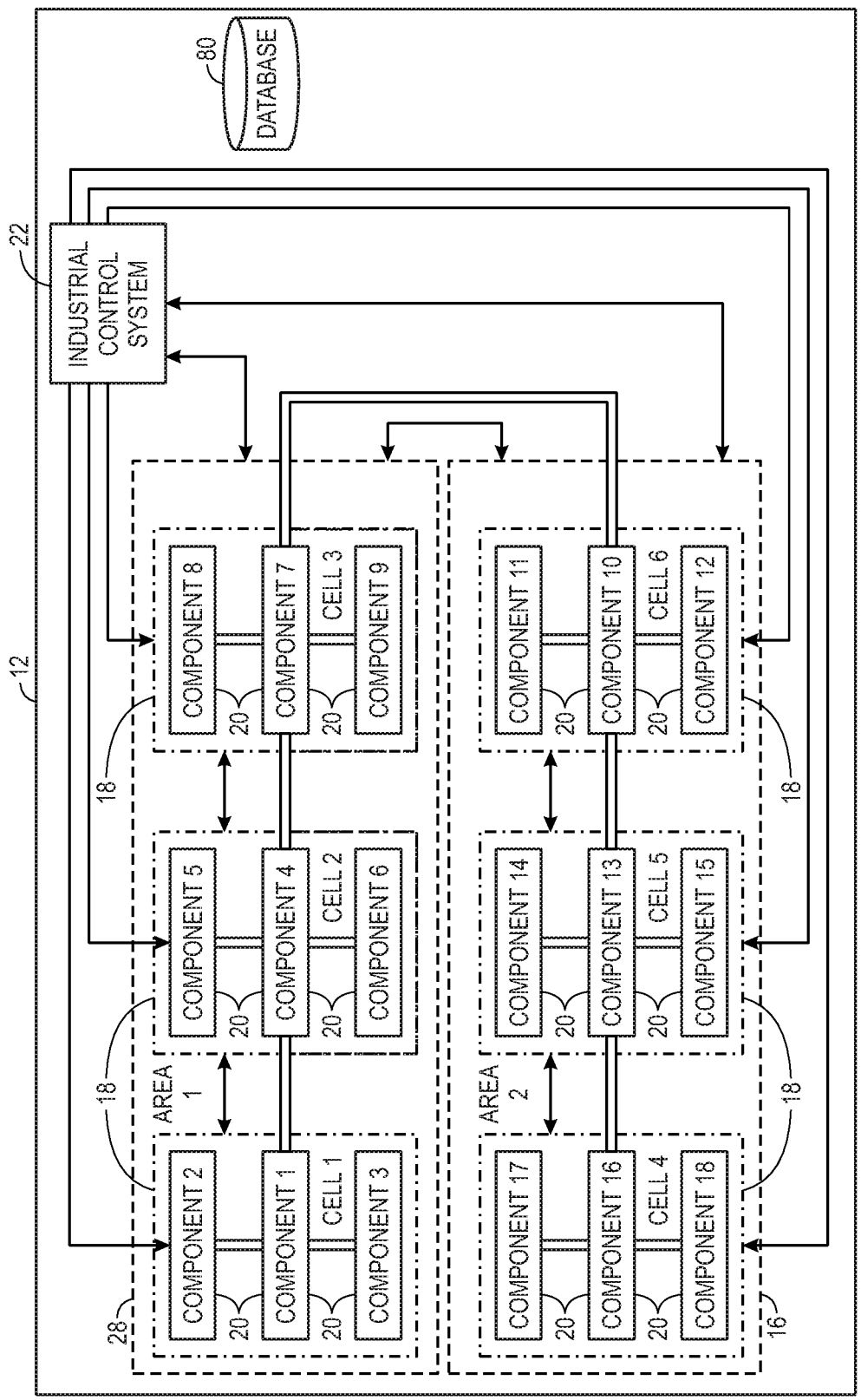
FIG. 4 illustrates a block diagram that depicts hierarchical levels of the example industrial automation system of FIG. 3, in accordance with an embodiment presented herein.

As shown in FIG. 4, each component 20 may correspond to a particular cell 18. That is, each component 20 that may be used by the respective station may be categorized as part of the respective cell 18.

In the same manner, the areas 16 may be categorized based on functions of the cells 18 of the packaging factory 50. For instance, cells 1-3 of the packaging factory 50 may correspond to a preparation process and cells 4-6 of the packaging factory 50 may correspond to a packaging process. As such, cells 1-3 may be categorized as area 1 and cells 4-6 may be categorized as area 2.

In one embodiment, the industrial control system 22 may determine the categories or scopes of the industrial automation system 10 based on a factory diagram or specification that describes the various processes employed by the industrial automation system 10 and the components 20 used for the respective processes. In another embodiment, each control system for each component 20 may include information indicating the function of the component 20, a location of the component 20 with respect to the industrial automation system 10, a part of a manufacturing process that the component 20 is associated with, or the like. Here, each respective control system of each respective component 20 may send this information to the industrial control system 22 or to other control systems of nearby components 20. The control system that receives the information may then determine how the component 20 that transmitted the information may relate to the various scopes of the industrial automation system 10, how the component 20 that received the information may be related to the component 20 that transmitted the information with respect to the various scopes of the industrial automation system 10, and the like. In certain embodiments, each control system may send information related to the scopes of the industrial automation system 10, information detailing a relationship between each scope of the industrial automation system 10, information detailing a relationship between each component 20 in the industrial automation system with respect to each scope of the industrial automation system 10, and the like to a database 80, which may be accessible by each control system as a centralized database or a database distributed between a number of machines, computers, or the like.

Common Data Pipeline

Figure 5:
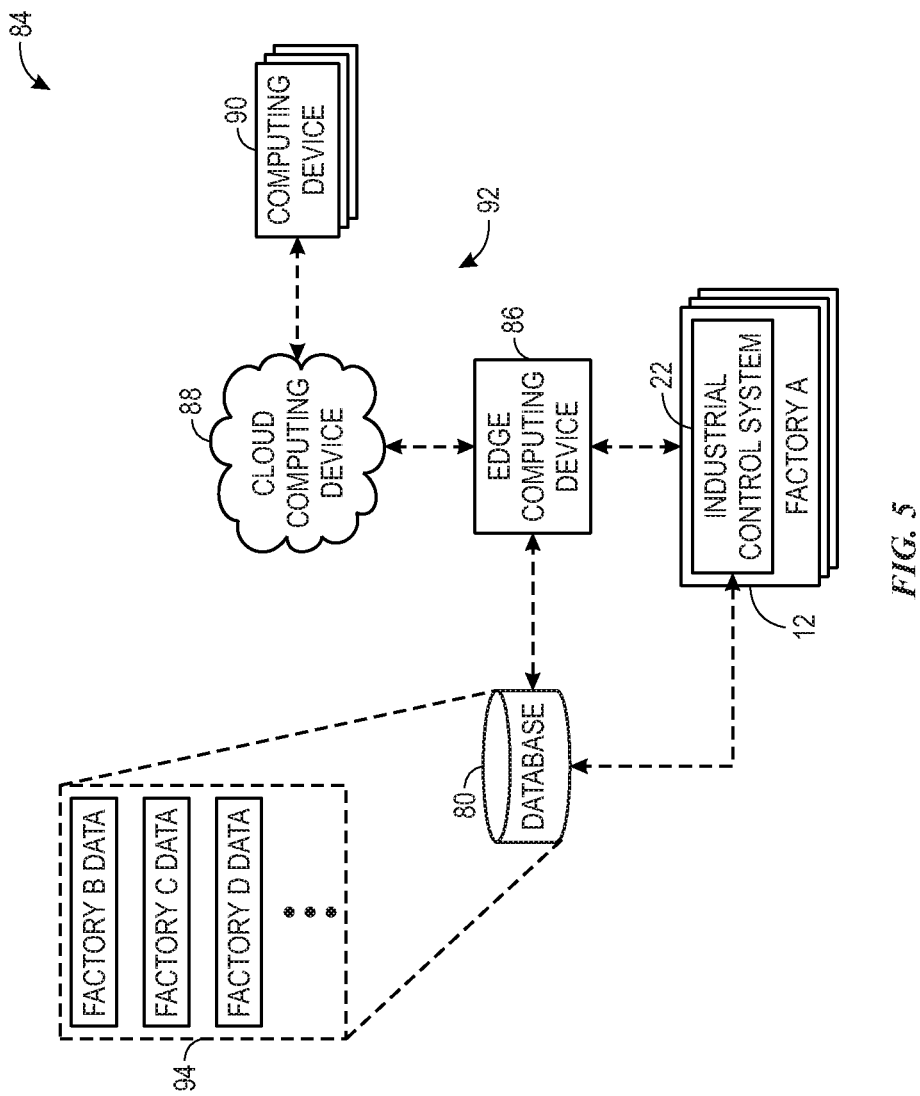
FIG. 5 illustrates a block diagram of a data analysis system that may be employed in the industrial automation system of FIG. 1, in accordance with an embodiment presented herein.

Additionally, the industrial control system 22 may communicate with other computing devices, such as computing devices not included in the factory 12 that may be controlled by other entities. For example, FIG. 5 depicts a data analysis system 84 that includes the factory 12 (which includes the industrial control system 22), the database 80, an edge computing device 86, a cloud computing device 88, and one or more other computing devices 90. The industrial control system 22 and database 80 may communicate with one another as discussed above. Moreover, the industrial control system 22 and database 80 may be communicatively coupled to the edge computing device 86, which may be a computing device such as a computer, server, router, routing switch, or integrated access device (IAD) that manages the flow of data into and out of a network, such as industrial automation network included in the factory 12 (e.g., a network utilized by the industrial control system 22 to communicate with the components of the industrial automation system 10 and the database 80). Accordingly, the edge computing device 86 may be included within the industrial automation system 10. Furthermore, while FIG. 5 includes a single edge computing device 86, in other embodiments, the data analysis system 84 may include more than one edge computing device 86.

The computing devices 90 may include computers, servers, or the like that are operated or managed by other entities. For example, the computing devices may be associated with other factories or an entity that provides one or more services for the factory 12 (or industrial automation system 10), such as data management, data analysis, security services, or diagnostic services (e.g., to determine or resolve potential errors associated with the industrial automation system 10 or the operation thereof). The computing devices 90 may communicate with the industrial automation system 10 (e.g., via the industrial control system 22) and database 80 via the cloud computing device 88 and the edge computing device 86 utilizing a common data pipeline that may be partially implemented via communication link 92. The communication link 92 may include communication infrastructure, such as a wired connection, wireless connection, or both that communicatively couples the edge computing device 86, the cloud computing device 88, and the computing devices 90 to one another. The common data pipeline generally refers to a communication infrastructure (e.g., the communication link 92) as well as one or more processes utilized to send, receive, and characterize data that is communicated using the communication infrastructure. As such, the techniques described herein may be implemented using already existing communication infrastructure (e.g., wired networks, wireless networks, or a combination thereof), thereby avoiding adding more communication infrastructure in potentially already crowded industrial environments.

The edge computing device 86, the cloud computing device, and the computing devices 90 may each include one or more processors that execute computer-readable instructions, such as instructions that may be stored in memory or a storage device that the edge computing device 86, the cloud computing device, and the computing devices 90 may also include. By executing such instructions, the one or more processors included in the edge computing device 86, the cloud computing device, and the computing devices 90 may communicate with one another via the common data pipeline, which is discussed below in more detail with respect to FIG. 6. In other words, the edge computing device 86, the cloud computing device 88, and the computing devices 90 may include the communication component 32, processor 34, memory 36, storage 38, and input/output (I/O) ports 40 described above and utilize these components to enable communication via the common data pipeline. Before proceeding to discuss the common data pipeline in more detail, it should be noted that, in other embodiments, the data analysis system 84 may not include the cloud computing device 88. In such embodiments, the computing devices 90 may communicate with the industrial control system 22 and database 80 via just the edge computing device 86. Furthermore, in some embodiments, the cloud computing device 88 may be implemented in the form of a system that includes more than one computing device.

The industrial control system 22 and the database 80 may share various types of data with the computing devices 90 using the common data pipeline. Likewise, the computing devices 90 may communicate with the industrial control system 22 and the database 80 via the common data pipeline. For example, the industrial control system 22 and database 80 may share data regarding the factory 12 (and data 94 regarding factories 14 in the case of the database 80) or components thereof with the edge computing device 86, which may selectively communicate the data to the cloud computing device 88. For instance, as described in more detail below, the edge computing device 86 may group data received from the industrial automation system 10 (e.g., via industrial control system 22 or the database 80), apply metadata 104A (e.g., data tags) to the received data, or both as part of a protocol before sending the data to the cloud computing device 88. By doing so, data associated with the factory 12 (or factories 14) may be characterized in a way that enables the cloud computing device 88 to determine which of the computing devices 90 to which to send the data. Moreover, characterizing the data enables the computing devices 90 and the cloud computing device 88 to interpret the data. For instance, as described above, the data associated with the factory 12 may pertain to a plethora of different devices that are made by different manufacturers and communicate using different protocols, such as FactoryTalk Live Data, EtherNet/IP, Common Industrial Protocol (CIP), OPC Direct Access (e.g., machine to machine communication protocol for industrial automation developed by the OPC Foundation), or any suitable communication protocol (e.g. DNP3, Modbus, Profibus, LonWorks, DALI, BACnet, KNX, EnOcean). By characterizing the data, the computing devices 90 and the cloud computing device 88 can determine what each particular portion of the data is. This may enable the computing devices 90 and cloud computing device 88 to determine a layout of the factory 12, the automation devices included in the factory 12 (or factories 14), and what the various forms of received data are (e.g., power consumption data, log files, or other data associated with the factory 12 (or factories 14).

Figure 6:
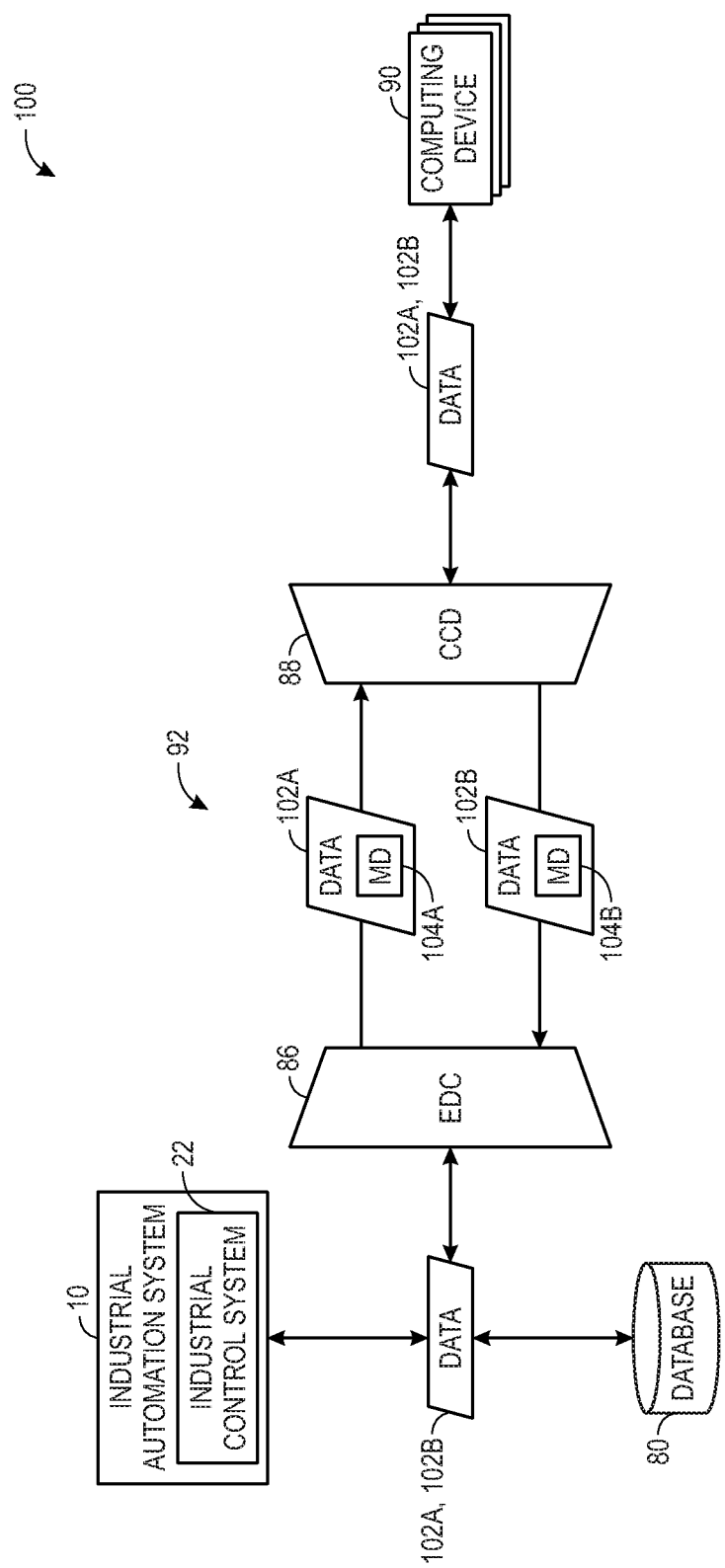
FIG. 6 illustrates a data communication system, in accordance with an embodiment presented herein.

To help elaborate, FIG. 6 illustrates a data communication system 100 that includes the communication link 92 as well as the industrial automation system 10, the database 80, the edge computing device 86, the cloud computing device 88, and the computing devices 90. Data 102A from the industrial automation system 10 and the database 80 may be shared with the computing devices 90 via the common data pipeline, which can entail the data 102A being provided to the edge computing device 86 and cloud computing device 88 (e.g., via the communication link 92). For example, for communication from the industrial automation system 10 (or database 80) to the computing devices 90, the edge computing device 86 may function as an ingress to the communication link 92 (and common data pipeline). The edge computing device 86 may communicate the data 102A in a secure manner (e.g., by encrypting the data 102A) with the cloud computing device 88, which functions as an egress from the communication link 92 (and the common data pipeline). The cloud computing device 88 or computing devices 90 may decrypt the received data 102A.

The data 102A may include a variety of different types of data that can be associated with the industrial automation system 10 or components thereof (e.g., the industrial control system 22, components included in the factory 12, or other electronic devices included in the industrial automation system 10). For example, the data 102A may include, but is not limited to, image data (e.g., video data) collected by one or more cameras included in the industrial automation system 10, audio data collected by one or more audio sensors (e.g., microphones) included in the industrial automation system 10, log files generated by the industrial control system 22, data regarding the components of the industrial automation system 10, information regarding software utilized by the industrial automation system 10 or components thereof, and inventory data. Log files may include files that provide information about the components of the industrial automation system 10, such as operation histories, maintenance histories, electrical power consumption data, and the like. Log files may also include information about users who access (e.g., physically or electronically) the industrial automation system 10, information related to security (e.g., security audit log data), and events associated with components of the industrial automation system 10 or software utilized to operate or control the components of the industrial automation system 10 (e.g., message logs, syslogs). Additionally, the data regarding the components of the industrial automation system 10 may include the log data or be indicative of the types of components within the industrial automation system 10, functions of components within the industrial automation system 10, the placement of components the industrial automation system 10 (e.g., a physical location within the factory 12), operating schedules of the components the industrial automation system 10, and the hierarchical levels of the industrial automation system 10.

Conversely, the computing devices 90 may send data 102B to the industrial automation system 10 (and database 80) utilizing the common data pipeline. For example, the computing devices 90 may send the data 102B to the cloud computing device 88, which may group the data 102B, characterize the data 102B (e.g., by applying metadata 104B to the data 102B), encrypt the data 102B, or a combination thereof before providing the data 102B to the edge computing device 86. The edge computing device 86 may receive the data 102B, decrypt the data 102B, and provide the data 102B to the industrial automation system 10, the industrial control system 22, the database 80, or a combination thereof.

The data 102B may include, but is not limited to, data resulting from analyzing the data 102A and updates for software that may be authored by an entity or organization in control of one or more of the computing devices 90. As an example, the computing devices 90 may process the data 102A to make various determinations regarding the data 102A. This may include making determinations regarding security within the industrial automation system 10 (e.g., based on analyzing audio data, video data, security audit log data or a combination thereof), diagnosing or troubleshooting errors or potential errors within the industrial automation system, maintenance operations recommended to be performed within the industrial automation system 10 or a portion thereof (e.g., on a particular component or within a particular hierarchical level of the industrial automation system 10), a combination thereof. As further examples, the data 102B may include telemetry data, network communication data, and data pertaining to alarms or events. For instance, based on analyzing the data 102A, the computing devices 90 may determine that an alarm should be triggered in the industrial automation system 10, whether a particular event occurred within the industrial automation system 10, or determine (e.g., diagnose) why an alarm or event occurred within the industrial automation system 10. Additionally, the data 102B may be data that is sent to alter the configuration of the edge computing device 86, to alter the configuration of the cloud computing device 88, or to add, remove, or configure one or more sources of the data 102A (e.g., one or more components of the industrial automation system 10).

Figure 7:
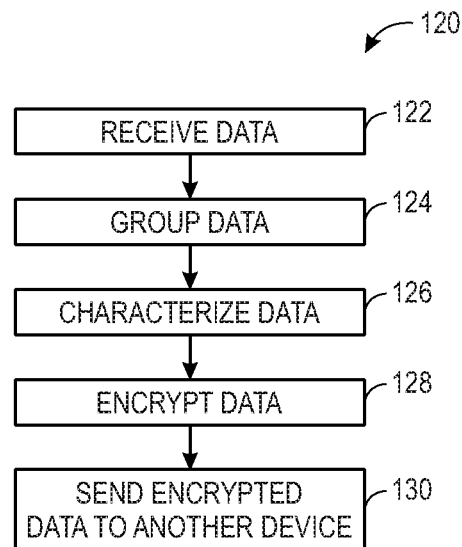
FIG. 7 illustrates a flow diagram of a process for communicating data within the data analysis system of FIG. 5 and the data communication system of FIG. 6, in accordance with an embodiment presented herein.

By utilizing the common data pipeline, the data 102A, 102B may be communicated between the computing devices 90 and industrial automation system 10 (and database 80) in an encrypted form and in which the communicated data may be grouped, characterized (e.g., tagged with metadata), or both, thereby enabling the data 102A, 102B to be communicated in a manner that is secure, enables receiving devices to understand the data regardless of the format of the data, and may reduce congestion over communication networks. To help describe how the data 102A, 102B may be shared using the common data pipeline, FIG. 7 is provided. In particular, FIG. 7 is a flow diagram of a process 120 for communicating data within the data analysis system 84 and data communication system 100. The process 120 may be performed by the edge computing device 86 (e.g., using data 102A) or the cloud computing device 88 (e.g., using data 102B) by processing circuitry (e.g. one or more processors included in the edge computing device 86 or the cloud computing device 88) executing computer-readable instructions stored on memory or storage of the edge computing device 86 or the cloud computing device 88. Additionally, the computing devices 90 may also perform any of the operations of the process 120 described below as being performed by the cloud computing device 88. Furthermore, in some embodiments, the operations of the process 120 may be performed in an order different than the order discussed below, operations of the process 120 may be omitted, or both. The process 120 generally includes receiving data (process block 122), grouping the received data (process block 124), characterizing the data (process block 126), encrypting the data (process block 128), and sending the encrypted data to another device (process block 130).

At process block 122, data is received. For instance, the edge computing device 86 may receive the data 102A from an industrial component 20 in the industrial automation system 10 (or database 80). As another example, the cloud computing device 88 may receive the data 102B from the computing devices 90. The data may include data from a number of industrial components 20 located in different hierarchical levels or locations within the industrial automation system 10. In some embodiments, the data may be requested from another industrial component 20, from an external computing device, or the like. Alternatively, the industrial component 20 may periodically send the data 102A according to a subscription service, an event being present (e.g., data above a threshold), or some other methodology.

At process block 124, the received data may be grouped or arranged, for instance, based on a type of the data, a component with which the data is associated, a hierarchical level with which the data is associated, or a combination thereof. For example, received data may be rearranged to group similar types of data together. More specifically, in the example of the edge computing device 86 receiving the data 102A, the edge computing device 86 may reorganize the data 102A to group log files together (which may even be sub-grouped based on the type of log file), group audio data together, group video data together, and group data regarding the industrial automation system 10 together. For example, data regarding the layout of the factory 12, hierarchical levels of organization of the industrial automation system 10, and information pertaining to the components of the industrial automation system or the operation thereof may be grouped. When grouping the data by component, the edge computing device 86 may rearrange received data packets so that data common to a particular component is grouped together. Similarly, the data for a hierarchical level may also be grouped together. For instance, data may be grouped by hierarchical level (e.g. a cell) and include the data for each component included within the hierarchical level. Within the grouped data, the data may be sub-grouped by component so that the data pertaining to each component is grouped together. As another example, data may also be grouped by hierarchical level and type. For instance, the data generated by, or associated with, components in a hierarchical level may be grouped. Within such groupings, the data may be further arranged by type. In such an example, energy consumption data for each component in a hierarchical level may be grouped together, and each other form of data for each of the components may be grouped together.

In the example of the cloud computing device 88 receiving the data 102B, the cloud computing device 88 may rearrange the data 102B based on the type of data or by the portion of the industrial automation system 10 to which the data 102B pertains, or a combination thereof. For instance, when grouping data by type, diagnostic data may be grouped together, potential or recommended maintenance operations may be grouped together, security determinations may be grouped together, and software updates may be grouped together. As another example, when arranging data based on the portion of the industrial automation system 10 to which the data 102B pertains, data associated with a specific component may be grouped together or data may be grouped based on the hierarchical levels of the industrial automation system 10. For example, portions of the data 102B pertaining to a particular component 20, cell 18, or area 16 may be grouped together.

In some embodiments, the grouping of the portions of the data 102A or the data 102B may be pre-defined according to a particular order or arrangement defined by the common data pipeline. That is, the data 102A or the data 102B may be organized such that packets that make up the data 102A or the data 102B are organized in a particular order (e.g., ordering packets of data by data type, a component with which the data is associated, a hierarchical level with which the data is associated, or a combination thereof). In this case, if datasets are not present for the data 102A or the data 102B, the respective packets may be null or include an indicator that data for that portion does not exist. For example, data packets may be reordered so that data for each component or type of data is organized together in a pre-defined order (e.g., based on an identifier associated with a component or type of data). When data for a component or type of data is missing, the grouped data may reflect that there is no data for that particular component or type of data. By organizing the data 102A and the data 102B in a consistent order, the various components 20 may extract or comprehend the data 102A or the data 102B in an efficient manner. Similarly, the computing devices 90 may also access and interpret data associated with the industrial automation system 10 (e.g., data 102A) regardless of the source of the data 102A or a communication, a manufacturer of the components that generate the data 102A, formats of the data 102A, and communication protocols utilized by the components that generate the data 102A.

At process block 124, the data may be characterized. More specifically, the edge computing device 86 may analyze the data 102A and apply metadata 104A (e.g., data tags or headers) to portions of the data 102A to characterize the data 102A. Likewise, the cloud computing device 88 may analyze the data 102B and may apply metadata 104B (e.g., data tags or headers) to the data 102B to characterize the data 102B. In the example of the edge computing device 86 applying metadata 104A to the data 102A, the metadata 104A may be indicative of a particular context associated with a particular portion of the data 102A, such as a component, hierarchical level, factory, or combination thereof within the industrial automation system 10 with which the particular portion of the data 102A is associated. For instance, the metadata 104A may be indicative of an origin of the data 102A at several different levels. For example, portions of the data 102A associated with a particular component may be tagged with metadata 104A indicating the component as well as one or more hierarchical levels of the industrial automation system 10 in which the component is included (e.g., a particular cell, area, factory or combination thereof). The metadata 104A may be indicative of a type of the data 102A. For instance, each log file may be tagged with one or more data tags indicating that the log file is a log file and that the log file includes a particular type of log data. As another example, the metadata 104A may indicate that the data is video data, audio data, information about software (e.g., a version of software utilized by the industrial automation system 10 or a component thereof) or another type of data generated or collected by the industrial automation system 10 (including data generated or collected by the industrial control system 22).

Similarly, the cloud computing device 88 may apply the metadata 104B to the data 102B to indicate what type of data the data 102B is. For instance, the metadata 104B may be utilized to indicate that a particular portion of the data 102B relates to software (e.g., software updates), a particular type of analysis performed on the data 102B (e.g., security determinations, maintenance determinations, diagnostic operations, and the like), or a particular recommendation (e.g., a diagnostic or maintenance operation recommended to be performed based on analyzing the data 102B). Furthermore, the cloud computing device 88 may apply metadata 104B to indicate a particular hierarchical level or component associated with the data 102B. For instance, when sending data relating to the analysis of a particular component or a recommended action to be performed associated with the particular component, the cloud computing device 88 may include the metadata 104B to also indicate that the data 102B relates the particular component or hierarchical level in which the component is included. Likewise, when the data 102B relates to a hierarchical level that encompasses several components (e.g., a cell or area within a factory), the metadata 104B may also be applied to indicate one or more hierarchical levels to which the data pertains.

At process block 128, the data 102A, 102B is encrypted. In other words, data that has been packaged (e.g., grouped), characterized (e.g., tagged with metadata), or both may be encrypted by the edge computing device 86 and the cloud computing device 88. The data may be encrypted in accordance with one or several encryption or cryptographic algorithms or protocols, such as Transport Layer Security (TLS), Secure Sockets Layer (SSL), Triple Data Encryption Algorithm (TDEA), Advanced Encryption Standard (AES), or public key system (e.g., Rivest-Shamir-Adleman (RSA) system, elliptic-curve cryptography (ECC)). Furthermore, the data 102A, 102B may be encrypted based on hierarchical levels, components, or a type of data. For example, data packets of the data 102A, 102B may be encrypted in an order (e.g., a pre-defined or random order) that is determined based on hierarchical levels, components, or a type of data. As such, the data 102A, 102B may be encrypted based on an order or arrangement of the data 102A, 102B (e.g., as grouped or reordered as described above with respect to process block 124).

At process block 130, the encrypted data is sent to another device. For example, the edge computing device 86 may send the data 102A to the cloud computing device 88. As another example, the cloud computing device 88 may send the data 102B to the edge computing device 86. The data 102A and data 102B may be sent using an Internet connection, such as an Internet connection made via a wired network or wireless network. Furthermore, the encrypted data may include a cryptographic key or other type of data that may enable devices received the encrypted data to decrypt the received data.

Figure 8:
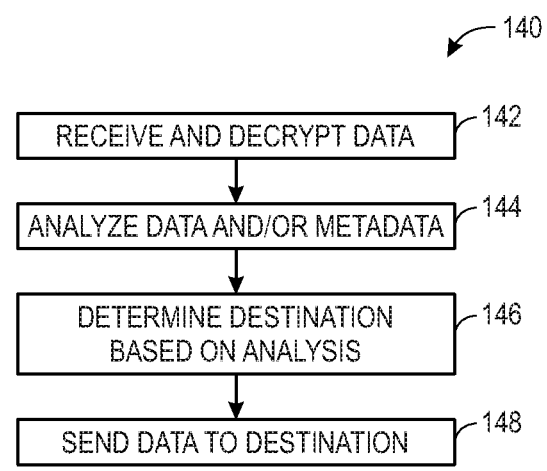
FIG. 8 illustrates a process for processing data received utilizing a common data pipeline, in accordance with an embodiment presented herein.

Having discussed how data can be packaged, characterized, encrypted, and sent using the common data pipeline, the discussion will now turn to FIG. 8, which is a flow diagram of a process 140 for processing data received via the common data pipeline. The process 140 may be performed by the edge computing device 86 (e.g., using data 102B) or the cloud computing device 88 (e.g., using data 102A) by processing circuitry (e.g. one or more processors included in the edge computing device 86 or the cloud computing device 88) executing computer-readable instructions stored on memory or storage of the edge computing device 86 or the cloud computing device 88. Additionally, the computing devices 90 may also perform any of the operations of the process 140 described below as being performed by the cloud computing device 88. Furthermore, in some embodiments, the operations of the process 140 may be performed in an order different than the order discussed below, operations of the process 140 may be omitted, or both. The process 140 generally includes receiving and decrypting data (process block 142), analyzing the received data, metadata included with the data, or both (process block 144), determining a destination for the data based on the analysis performed at process block 142 (process block 146), and sending the data to the determined location (process block 148).

At process block 142, data may be received and decrypted. For example, the edge computing device 86 may receive data 102B sent by the cloud computing device 88. As another example, the cloud computing device 88 may receive data 102A sent by the edge computing device 86. Additionally, the edge computing device 86 and cloud computing device 88 may decrypt the received data in accordance with the encryption or cryptographic algorithms or protocols discussed above with respect to process block 130 of FIG. 7.

At process block 144, the received data, metadata included with the data, or both the data and metadata may be analyzed. For instance, in the example of the edge computing device 86 receiving data 102B (that includes metadata 104B) from the cloud computing device 88, the edge computing device 86 may analyze the data 102B, the metadata 104B or both. The analysis may include determining to which component, hierarchical level, factory, or combination thereof the data 102B pertains. The analysis may also include determining what type of the data the data 102B, which may be indicated by the metadata 104B included with the data, by a filename extension of the data 102B, or both.

In the example of the cloud computing device 88 receiving the data from the edge computing device 86, the cloud computing device 88 may analyze the data 102A, metadata 104A, or both to make various determinations regarding the data. For example, the cloud computing device 88 may determine a context for the data 102A based on the metadata 104A, which may indicate a type of the data, which portion (e.g., a specific component, hierarchical level, or factory) of the industrial automation system 10 the data 102A pertains to, or both. As another example, the cloud computing device 88 may determine that a new device or component has been added to the industrial automation system 10. For instance, metadata 104A may be indicative of a portion of the data 102A pertaining to a device or component of that the cloud computing device 88 does not recognize as being included in the industrial automation system 10. Based on the metadata 104A, the cloud computing device 90 may determine the device or component has been added to the industrial automation system, one or more contexts (e.g., hierarchical levels) associated with the device or component, and one or more functions performed by the device or component. Thus, while the data 102A itself may not include any context for what the data 102A is or what portion of the industrial automation system 10 the data is associated with, the cloud computing device 88 may nevertheless be able to determine the context for the data by analyzing the metadata 104A (e.g., data tags) previously applied to the data 102A. Accordingly, by utilizing metadata that is included with data before it is communicated, the cloud computing device 88 is able to receive data from several factories (e.g., factory 12 and factories 14) and determine a particular component in a particular factory that the data 102A pertains to even in cases when the cloud computing device 88 may otherwise be unable to make such a determination (e.g., in cases where different communication protocols are used, file extensions are not recognized, or the like).

At process block 146, a destination for the received data may be determined based on analyzing the data, metadata included with the data, or both. For example, in the case of the edge computing device 86 receiving the data 102B, the edge computing device 86 may determine whether to provide the received data to the database 80, a particular portion of the industrial automation system 10, or both. For example, the data 102B may include a header (e.g., previously added as metadata 104B) indicating where the data 102B should be directed. As another example, the edge computing device 86 may provide the data 102B to a controller (e.g., a controller included in the industrial control system 22) that is responsible for controlling a particular component or hierarchical level within the industrial automation system 10 that is indicated by the metadata 104B.

In the case of the cloud computing device 88 receiving the data 102A, the cloud computing device 88 may determine to which particular computing device of the computing devices 90 the data 102A should be provided. Such a determination may be made by analyzing a header that may have been previously applied to the data 102A as metadata 104A by the edge computing device 86. The computing devices 90 may include computing devices that are associated with different entities. For example, the computing devices 90 may belong to or be associated with an entities that provide different various services for the industrial automation system, such as, but not limited to security services, data analysis or management services, and maintenance services. The metadata 104A may indicate a particular service or entity. In such a case, the cloud computing device may provide the data 102A to the computing device associated with the indicated entity or service. Furthermore, it should be noted that different portions of the data 102A, 102B may pertain to different components or services. The edge computing device 86 and cloud computing device 88 may determine different destinations for the various portions of the data 102A, 102B.

At process block 148, the data may be sent to the determined destination. More specifically, the edge computing device 86 may provide the data 102B to the database 80, a particular portion of the industrial automation system 10, or both, based on the analysis performed at process block 146. Similarly, the cloud computing device 88 may send the data 102A to a particular computing device 90 based on the determination performed at process block 146. Additionally, in cases in which different portions of the data 102A, 102B are determined to be sent to different locations, the edge computing device 86 and the cloud computing device 88 may provide the respective portions of data to the respective destinations determined for each of the portions of the data 102A, 102B.

By utilizing the common data pipeline in accordance with the process 120 and the process 140, data may be communicated between the industrial automation system 10 and the computing devices 90 in a secure (e.g., encrypted) manner in which the data is organized and characterized. As such, a device receiving the data is able to analyze the data and provide the data to another device regardless of the type of device associated with the data or from which the data originates, the manufacturer of such devices, or communication protocols that such devices may otherwise use. Furthermore, because devices outside of automation systems are able to determine one or more contexts associated with data received from an automation system (e.g., industrial automation system 10), the external devices (e.g., computing devices 90) may be able to perform enhanced data analysis specific to a particular portion (e.g., factory, hierarchical level, or component) included in the industrial automation system 10. For example, because the computing devices 90 are better able to understand the relationship between different devices included in the industrial automation system 10 and how received data relates to the industrial automation system 10 (or a particular portion thereof), the computing devices 90 may be utilized to perform more specific and accurate analyses of data provided by the industrial automation system 10. Additionally, because the computing devices 90 are better able to understand the relationship between different devices included in the industrial automation system 10 and how received data relates to the industrial automation system 10 (or a particular portion thereof), the computing devices 90 may be able to further contextualize data or enhance data packages (e.g., groups of data packets) generated and provided by the computing devices 90 (e.g., data packages included in the data 102B).

Moreover, using the techniques described herein, external devices may be able to request and receive data specific to particular devices or portions of the industrial automation system 10. For example, because the computing devices 90 are able to determine the context(s) associated with received data, the computing devices 90 can determine that received data is a particular type of data associated with a particular component, hierarchical level, factory, or combination thereof. Accordingly, the computing devices 90 may request specific types of data, data pertaining to a specific portion of the industrial automation system 10, or both. Somewhat similarly, the computing devices 90 may be able to subscribe to data channels specific to a particular type of data or a specific component, hierarchical level, or factory within the industrial automation system, thereby enabling the computing devices 90 to receive specific data.

Furthermore, by grouping data before sending the data, the techniques disclosed herein my reduce traffic over networks, thereby reducing the occurrence of network congestion. For example, the edge computing device 86 and cloud computing device 88 may aggregate data before sending it. In other words, the edge computing device 86 and cloud computing device 88 may limit use of communication networks for example, because the edge computing device 86 and cloud computing device 88 may not transmit data until the data has been grouped. Accordingly, because the edge computing device 86 and cloud computing device 88 may less constantly utilize networks to send data, the techniques described herein may reduce network congestion.

Additionally, because the data 102A, 102B is arranged in a particular arrangement (e.g., grouped as discussed above with respect to FIG. 7), the edge computing device 86 and cloud computing device 88 may be able to more quickly aggregate received data, which may enable the received data to be analyzed more quickly. For example, because similar data may be organized together in data before it is transmitted from one device to another, fewer processing resources may be utilized by the receiving device when analyzing the received data or making determinations regarding the received data. Moreover, while data is being aggregated (e.g., grouped) or after data has been aggregated, the edge computing device 86 and cloud computing device 88 may send one or more portions of the aggregated data to components of the industrial automation system 10 or one or more computing devices 90 that subscribe to the data (e.g., a data feed that includes any updates regarding particular types of the data or data associated with a particular component or hierarchical level). Thus, the edge computing device 86 may coordinate data traffic across the industrial automation system 10 to limit network use while still being able to receive data from the devices included in the industrial automation system 10.

In some embodiments, one or more of the computing devices 90 may be included as part of the cloud computing device 88 or the cloud computing device 88 may be utilized to encrypt data, decrypt data, and analyze data. As such, while the process 120 and the process 140 are described above as being performed utilizing data originating from the industrial automation system 10 (e.g., in an embodiment of the process 140 illustrated in FIG. 8) as well as data to be sent to the computing devices 90 or originating from the computing devices 90 (e.g., in embodiments of the process 120 illustrated in FIG. 7), the cloud computing device 88 may perform the various operations discussed above with respect to the computing devices 90. For example, the cloud computing device 88 may receive the data 102A, decrypt the data 102A, analyze the data 102A, generate the data 102B, encrypt the data 102B, and send the data 102B to the edge computing device 86.

Additionally, it should be noted that the data 102B may enable a user to remotely access the industrial automation system 10 or components thereof, for example, to perform troubleshooting or to configure the industrial automation system 10 or components thereof. Accordingly, while the data 102A may include data generated by industrial automation system 10, the data 102B may be data sent regarding an analysis of the data 102A or data sent to gain access to the industrial automation system 10 or components thereof. For example, the cloud computing device 88 or computing devices 90 may receive and decrypt the data 102A, analyze the data 102, and send the data 102B to gain remote access to the industrial automation system 10 (or components thereof) and make changes to the industrial automation system 10 or components thereof.

Furthermore, while hierarchical levels of the industrial automation system 10 discussed above include factories (e.g., factory 12 and factories 14) include areas 16, cells 18, and components 20, in other embodiments, different hierarchical levels may be utilized, and the amount of hierarchical levels utilized may also differ. For example, in another embodiment, the industrial automation 10 may include factory-level hierarchical levels, area-level hierarchical levels, location-level hierarchical levels, machine-level hierarchical levels, line-level hierarchical levels, panel-level hierarchical levels, device-level hierarchical levels, component-level hierarchical levels, or any combination thereof. Factory-level hierarchical levels may include individual factories, such as the factory 12 or one of the factories 14. Area-level hierarchical levels may correspond to areas 16. Location-level hierarchical levels may be physical areas related to physical portions (e.g., rooms, floors, or other subsections) of a factory. In some cases, location-level hierarchical levels may include components associated with a particular portion of a process associated with an area 16. Accordingly, the location-level hierarchical levels may corresponds to cells 18. Machine-level hierarchical levels may include individual machines that are utilized to perform a function within the industrial automation system 10, and component or device-level hierarchical levels may include devices or components included in a machine-level hierarchical level or devices or components that are otherwise not included in machine-level hierarchical level. Line-level hierarchical levels may include machines, devices, and components that are associated with a particular assembly line within a factory. Panel-level hierarchical levels may include devices, components, or machines that are associated with a particular panel, such as a particular HMI or operator interface that is physically closest to the devices, components, or machines or which an operator may use to control or interact with the devices, components, or machines. Accordingly, operations discussed above relating to hierarchical levels, such as grouping data by hierarchical level, may be performed utilized these hierarchical levels in addition to, or as an alternative to, utilizing factory, area, cell, and component-level hierarchical levels.

Code Optimization and Servicing

As mentioned above, the industrial automation system 10 may employ a number of industrial automation components 20 to perform various industrial processes. The industrial automation components 20 may be capable of connecting to an industrial automation network that may facilitate communication between the connected industrial automation components 20 and one or more remote systems (e.g., industrial component management system). Data related to the industrial automation system 10 may be communicated throughout the industrial automation network using the common data pipeline. In one embodiment, the industrial automation network may be operated and controlled by a different entity than the industrial automation system 10. In one embodiment, the industrial automation network may include an asset management system to remotely monitor, control, support, and maintain operations of a variety of assets (e.g., the industrial automation components 20, other devices and/or equipment, workflows, procedures, and processes) in the industrial automation system 10. The asset management system may create a number of Digital Twins each representing a corresponding asset in the industrial automation system 10. The asset management system may enable a user to utilize a Digital Twin to remotely (e.g., via the industrial automation network) monitor, control, support and maintain operations of an asset corresponding to the Digital Twin. For example, the asset management system may allow the user (e.g. a technician) to have access to certain code (such as operational code, maintenance code, troubleshooting code, and firmware) associated with the asset that may have issues. The client may use/supervise the Digital Twin uniquely assigned to the asset to analyze the collected asset-related data, to conduct simulations using a simulator coordinated with the Digital Twin, to run diagnose and/or trouble shooting to find the root causes of respective issues based on data analysis and simulations, and to update the code to enable appropriate solutions to the issues.

Figure 9:
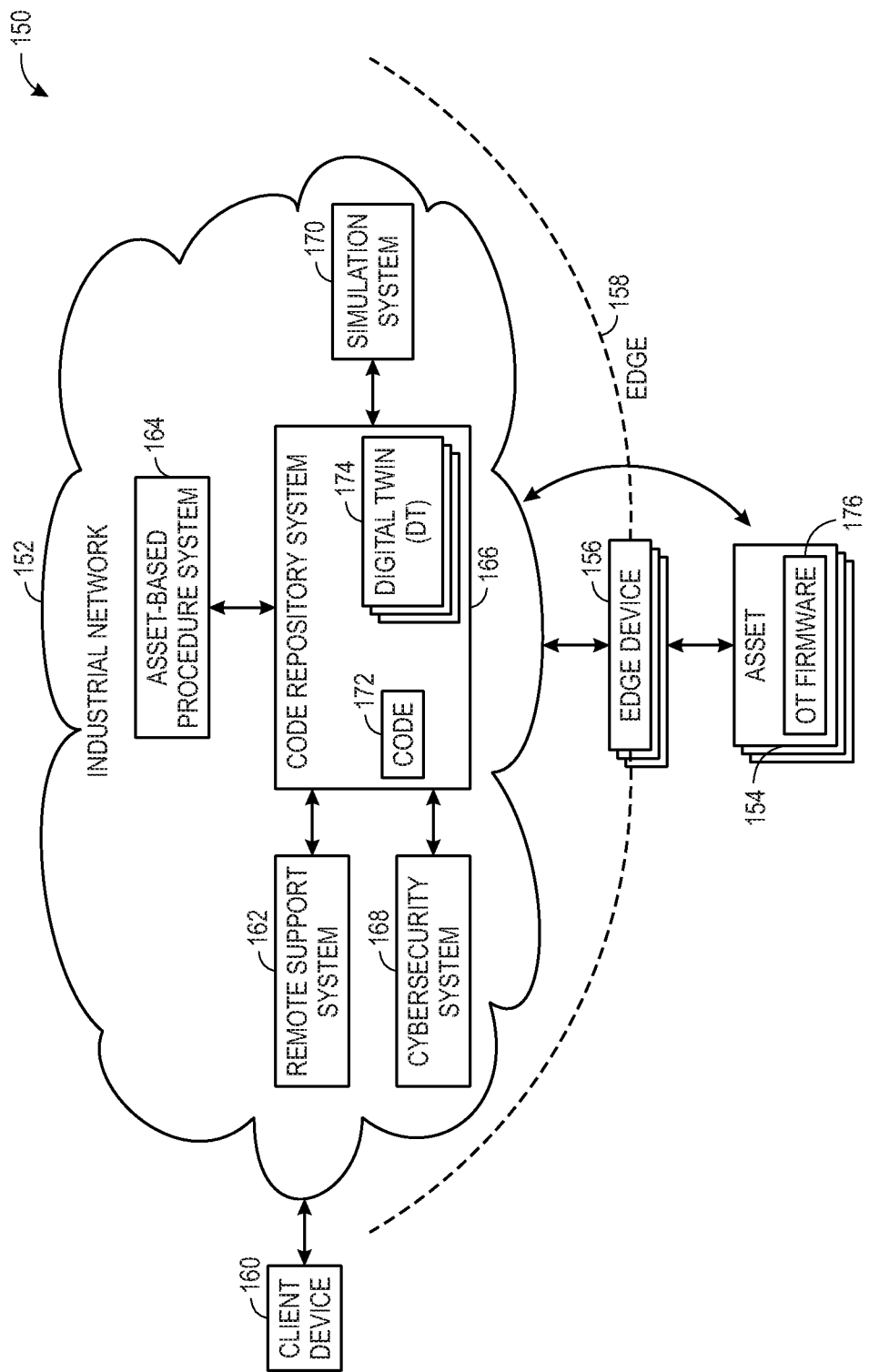
FIG. 9 illustrates a block diagram of an asset management system that may be used to remotely access the industrial automation system of FIG. 1, in accordance with an embodiment presented herein.

With the foregoing in mind, FIG. 9 illustrates a block diagram of an asset management system 150 that may be used to access the industrial automation system 10 of FIG. 1. The asset management system 150 may include an industrial network 152. The industrial network 152 may be implemented by a variety of computing devices (e.g., cloud computing device 88), storage devices, and connecting devices (e.g., routers, switches, gateways). A number of assets 154 may be communicatively connected to the industrial network 152 via respective edge devices 156 (which may be edge computing devices 86) located at an edge 158 of the industrial network 152. The assets 154 may include both IT devices (e.g., network switches, data center devices, virtual machines) configured to manage data transmitted through the industrial network 152 and OT devices (e.g., controllers) configured to manage or control physical devices (e.g., drive 26, motor 27, and conveyor 28). In some embodiments, certain assets 154 may be communicatively coupled to the industrial network 152 without using the edge devices 156. In some embodiments, a client (e.g., a technician) may use a client device 160 (e.g., computing device 90) to access the industrial network 152.

As illustrated, the industrial network 152 includes a remote support system 162, an asset-based procedure system 164, a code repository system 166, a cybersecurity system 168, and a simulation system 170. Each of the remote support system 162, the asset-based procedure system 164, the code repository system 166, the cybersecurity system 168, and the simulation system 170 may include one of more processors of the computing devices (e.g., cloud computing device 88) that may execute computer-readable instructions stored on memory/storage devices of the computing devices. The code repository system 166 may include code 172 and a number of Digital Twins (DTs) 174. The Digital Twins 174 may be virtual instances (e.g., digital representations) of the respective assets 154. The Digital Twins 174 may provide flexible ways in which the asset management system 150 may be implemented to monitor and control the assets 154. For example, a technician may use the client device 160 to access a particular Digital Twin 174 to remotely monitor, operate, troubleshoot, or maintain a corresponding asset 154.

The asset management system 150 may use the industrial network 152 to facilitate communication between the assets 154, the edge devices 156, the client device 160, the remote support system 162, the asset-based procedure system 164, the code repository system 166, the cybersecurity system 168, and the simulation system 170. The industrial network 152 may include one or more wired or wireless networks, including, but not limited to, local area networks (LANs), wide area networks (WANs), wireless WANs (WWANs), wireless LANs (WLANs), mobile communications networks (e.g., 3G, 4G, 5G, Edge, etc.), and so forth. For example, the asset management system 150 may use a local area network (LAN) that includes a variety of computing and network devices including, but not limited to, switches, servers (e.g., processors), storage (e.g., memory), and routers. The above-mentioned systems/devices may communicate with each other using a variety of communication protocols, such as Open Database Connectivity (ODBC), TCP/IP Protocol, Distributed Relational Database Architecture (DRDA) protocol, Database Change Protocol (DCP), HTTP protocol, Bluetooth, Wi-Fi, Near Field Communication (NFC), other suitable current or future protocols, or combinations thereof.

In some embodiments, data generated from operations of the assets 154 may be combined in common data packets or protocols and transmitted via the common data pipeline, including communication between components of the industrial network 152. In some implementations, the communications between the above-mentioned systems/devices may be encrypted or otherwise secured. For example, the communications may employ one or more public or private cryptographic keys, ciphers, digital certificates, or other credentials supported by a security protocol, such as any version of the Secure Sockets Layer (SSL) or the Transport Layer Security (TLS) protocol.

As mentioned above, the assets 154 may include any type of industrial system (e.g., the industrial automation system 10) and/or device (e.g., the industrial automation components 20) and workflows, procedures, and processes related to operating such industrial systems and/or devices that may be located in the industrial automation system 10 (e.g., within the factory 12, factories 14, areas 16, or cells 18). In one embodiment, each of the assets 154 may include an Operational Technology (OT) firmware 176. The OT firmware 176 may be a specific class of computer software that provides certain controls for the asset 154. For example, the OT firmware 176 may provide a standardized operating environment (e.g. an operating system) for a specific asset 154 (e.g., a device) to perform control, monitoring, and data manipulation functions. In one embodiment, the OT firmware 176 may be stored in non-volatile memory devices such as ROM, EPROM, or flash memory. In some circumstances, the OT firmware 176 may be updated after manufacture. For example, updates may include fixing bugs or adding features to the asset 154.

The edge devices 156 may include network routers and/or switches that may be located at the edge 158. In some embodiments, the edge devices 156 may host the industrial control system 22 that may be used to control and operate the assets 154 (e.g., industrial automation components 20) that are communicatively coupled to the respective edge devices 156. The edge devices 156 may serve as local hubs for data transfers between the assets 154 and the industrial network 152. The industrial control system 22 or portions thereof embedded within the edge devices 156 may be strategically positioned within the industrial network 152 to access or receive data associated with the assets 154. As such, the industrial control system 22 may perform various types of analyses on the received data and may then control and operate the respective assets 154 more efficiently or effectively based on the results of the analyses.

The client device 160 may include any suitable type of computing device, such a computing device that includes one or more processors capable of executing computer-readable instructions. In some embodiments, the client device 160 may be a portable computing device, such as a smartphone, tablet, electronic glass, wearable device, implanted computer, automotive computer, portable gaming platform, and so forth. In some embodiments, the client device 160 may also be a less portable type of computing device, such as a desktop computer, laptop computer, game console, smart appliance, and so forth.

In some embodiments, the client device 160 may be used to provide additional information to the asset management system 150 for determining root causes for certain issues associated with corresponding assets 154. The client device 160 may also send and receive information (e.g., certain notifications, requests) to and from the asset management system 150.

The asset management system 150 may use the remote support system 162 to obtain inquiries (e.g., tickets and/or other service requests) received by a Customer Support and Maintenance (CSM) system regarding the assets 154 experiencing certain issues, gather application data related to the assets 154, assess and diagnose the issues using gathered data, and identify appropriate solutions based on assessing and diagnosing. For example, the inquiries may be received via tickets or some other service requests that specify the assets 154, issues related to the assets 154, and the like. A CSM team may have ownership, type, and/or location information of the assets 154. However, certain data, such as asset application data or data related to how the assets 154 are being utilized in a system (e.g., the industrial automation system 10) may not be available for the CSM team. Such asset application data may be useful in assessing and diagnosing issues that may be related to the cause of the issues. The remote support system 162 may be used to gather and transmit the asset application data along with the service requests, which may assist the CSM team in identifying solutions to issues more efficiently and/or accurately. That is, data regarding the ownership, type, and location of the assets 154 within the industrial automation system 10, which may be known, can be combined with information related to the jobs or tasks being performed by the assets 154 to better access the operating conditions of the assets 154 and determine the causes of any issue experienced by the assets 154.

The remote support system 162 may enable the assets 154 to report data within a hierarchy (e.g., an asset hierarchy) that is interpretable by multiple parties, including support personnel tasked with resolving issues. The reported data may be used by the asset-based procedure system 164 to perform asset-based procedures to tie in workflow or procedures to specific assets 154, tasks performed by the assets 154, or operations performed by technicians on the assets 154. For example, certain tools (e.g., safety-related tools for tracking execution of safety protocols of the assets 154) may be employed in the industrial automation system 10. It may be useful to modify these tools to enable them to receive asset-based procedures that the assets 154 are using for performing various tasks. Such procedures may include workflows for troubleshooting problems commonly experienced on certain equipment with links to additional media, such as augmented reality, video, and the like. In some embodiments, the tools receiving the asset-based procedures may be synchronized by the asset-based procedure system 164 with hierarchy information (e.g., related to the asset hierarchy) to provide proper context of the reported data for a user (e.g. a technician).

As described above, data generated from operations of the assets 154 may be combined in common data packets or protocols transmitted via the common data pipeline. The common data pipeline may be a common format or platform in which data is communicated throughout the industrial network 152 and the asset management system 150. Various aspects of the remote support system 162 and the asset-based procedure system 164 may be combined in a common data packet or protocol that is transmitted via the common data pipeline.

Different types of data, such as code, may be collected and stored for retrieval by another party at various times. For example, the code repository system 166 may receive and store data from the assets 154, and the data may be retrieved by the client device 160. The collected data may include code being executed by various components (e.g., assets 154) and systems (e.g., remote support system 162, asset-based procedure system 164), machine-learning models, augmented reality experiences, drive parameters, drawings, schematics, network diagrams, operating procedures, and the like. In certain types of equipment, information used for backups may be stored on storage components locally on the equipment. With this in mind, a data repository service implemented by the code repository system 166 may receive the backup information for storage and perform comparison operations to determine the differences between the previously stored information and the newly stored information. In addition, as information is received regularly, the data repository service may organize the information with respect to a collection of machines or a known hierarchy, as described above.

More specifically, the code repository system 166 may perform a data repository service for hosting the code 172 and the Digital Twins 174. The code repository system 166 may be used to maintain a database of code used for various purposes in operations of the assets 154. By maintaining the database of codes, firmware revisions, and other information that is presently associated with installed assets 154, support personnel (e.g., utilizing the client device 160 to access the industrial network 152) may be better equipped to analyze the operational parameters of the assets 154. For example, evaluating present code stored in the code repository system 166 may assist the support personnel to identify shortcomings or errors in the code 172. The code repository system 166 may utilize the Digital Twins 174 to manage operations of the corresponding assets 154. Additional details with regard to managing the assets 154 using respective Digital Twins 174 will be discussed below with reference to FIGS. 11 and 12.

In addition to storing information, the data repository service may emulate the stored code in a cloud-based environment to determine how the code will operate. For example, users (e.g., technicians) may run emulations using the simulation system 170, which may implement various emulation techniques and services that may be utilized to assist the users with troubleshooting, programming, or controlling the various components (e.g., assets 154) of the asset management system 150. In one embodiment, the simulation system 170 may be used to simulate asset code performance after code updates, as described in more detail below with reference to FIG. 13.

The code repository system 166 may store the code 172 being executed by various components (e.g., assets 154), remote support (e.g., remote support system 162), asset-based procedures and workflows (e.g., asset-based procedure system 164), simulations (e.g., simulation system 170), machine-learning models, augmented reality experiences, drive parameters, drawings, schematics, cybersecurity, firmware (e.g., firmware stored in Digital Twins 174 and associated with the OT firmware 176 in the corresponding assets 154), network diagrams, and the like. In some embodiments, the code repository system 166 may also store documents related to the code 172 (e.g., code description, code applications, code update histories).

In some embodiments, the asset management system 150 may use the edge devices 156 and receiving devices to enable connected microservices to facilitate data transmissions with improved data security, as described in more detail below with reference to FIG. 14.

The cybersecurity system 168 may coordinate a number of data sources (e.g., the assets 154, the edge devices 156, the client device 160, the remote support system 162, the asset-based procedure system 164, the code repository system 166, the cybersecurity system 168, and the simulation system 170) and analyze the collected data. In one embodiment, the cybersecurity system 168 may monitor the assets 154 for potential or occurring cybersecurity threats (e.g., hacking attempts, data breaches, malware, phishing, denial of service attack, attacks on IoT devices, man-in-the-middle attacks, Domain Name System (DNS) tunneling, SQL injection) and provide alerts to the assets 154 regarding the detected cybersecurity threats. The cybersecurity system 168 may obtain log files from relevant systems (e.g., the industrial control system 22) and devices (e.g., edge computing device 86, cloud computing device 88, computing device 90) in response to detecting a cybersecurity threat or issuing an alert. The log files may include a list of events that occur in an operating system of software. The cybersecurity system 168 may detect threats based on simulations of various assets 154 (e.g., simulations performed by the cybersecurity system 168 using Digital Twins 174), as described in more detail below with reference to FIG. 16.

In addition to simulating cybersecurity threats, the asset management system 150 may use the Digital Twins 174 to coordinate with the simulation system 170 to test OT patches and firmware updates in an emulator environment to ensure that assets 154 will operate in accordance to desired output parameters, as described in more detail below with reference to FIG. 17.

Although the industrial network 152, the assets 154, the edge devices 156, the edge 158, and the client device 160 are described with respect to specific operations, it should be noted that the present embodiments described herein may be implemented in any suitable asset-related data collection system. That is, the presently disclosed embodiments should not be limited the examples provided in FIG. 9. Instead, the embodiments described herein may be applied to any data collection system that collects asset-related data of from a variety of assets. Furthermore, it should be noted that the systems, devices, and components described above with regard to the asset management system 150 are exemplary systems, devices, and components. The asset management system 150 may include additional or fewer components than those shown in FIG. 9.

During operation of an industrial system (e.g., the industrial automation system 10), different types of data may be generated from various assets 154 (e.g., industrial automation components 20), edge devices 156, and systems/devices of the industrial network 152 (e.g., Digital Twins 174 corresponding to the assets 154). The generated data may be combined in common data packets or protocols transmitted throughout the industrial network 152 via the common data pipeline. The common data pipeline may provide various functions to extract, organize, move, and send data as well as to maintain connectivity and data security. The common data pipeline may also provide functions to protect the data sent to and/or received from the industrial network 152. For example, certain data may be transmitted using trusted broker services.

As mentioned previously, the Digital Twins 174 may be digital representations of the respective assets 154 in a computational environment. The Digital Twins 174 may provide flexible ways in which the asset management system 150 may be implemented to provide various services for clients. Each of the Digital Twins 174 may include several components such as a Digital Twin model (e.g., computer model), data associated with the respective asset 154, and other information related to the respective asset 154. For example, the data associated with the respective asset 154 may be collected by leveraging the common data pipeline that may span from IoT data, security logs, software, firmware and code associated with the respective asset 154. The other information related to the respective asset 154 may include information collected from clients (e.g., operators of the industrial automation system 10) or other data sources such as product data, maintenance data, performance data, inventory, lockout/tagout (LOTO) Safety and CAD models that may be used to further enrich the Digital Twin model. The enriched Digital Twin model combined with real time data, historical data, and application context may enable service providers to provide services across a Lifecycle of the asset 154. In certain asset management phases such as sustain and optimize phases, uses of the Digital Twins 174 may enable the service providers to leverage current and past Digital Twin data to troubleshoot root causes, provide guide instruction through Augmented Reality, run simulations for optimization services and compare performance of the assets having same or similar Digital twins and deployed in different industrial applications. The ability to collect and contextualize data from a variety of assets allows the service providers to remotely perform holistic evaluations of the assets and understand the best way to optimize or troubleshoot the assets from hardware, software, firmware or security standpoint.

Figure 10:
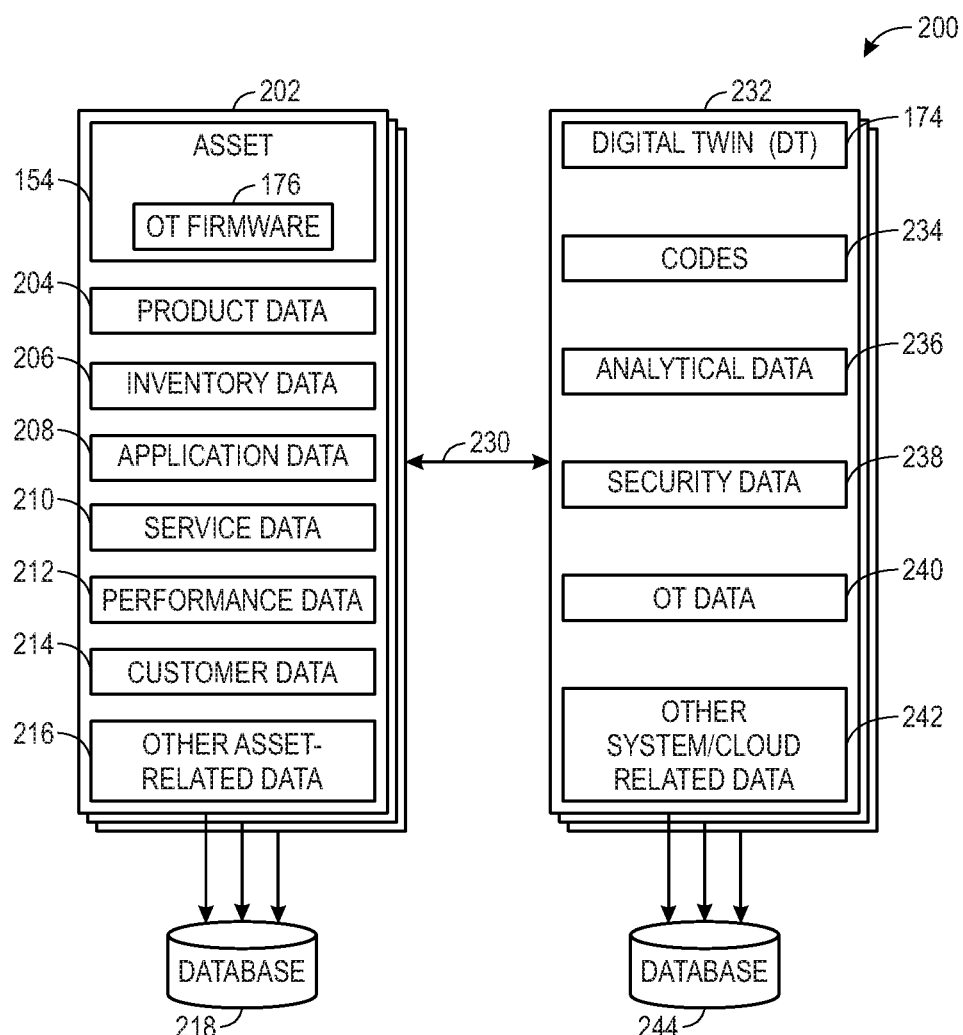
FIG. 10 illustrates a block diagram of asset-related data categories that may be used by the asset management system of FIG. 9, in accordance with an embodiment presented herein.

With the foregoing in mind, FIG. 10 illustrates a block diagram of asset-related data categories 200 that may be used by the asset management system 150 of FIG. 9. The asset-related data categories 200 describe different types of data generated by the assets 154 and the Digital Twins 174 assigned to the corresponding assets 154. The asset-related data categories 200 may include a first group of data categories 202 and a second group of data categories 232. The first group of data categories 202 may include various types of data generated during operations of the assets 154. The data in the first group of data categories 202 may be stored in a database 218. In some embodiments, the database 218 may include local databases (e.g., the database 80) used in the industrial automation system 10. The second group of data categories 232 may include various types of data related to the Digital Twins 174 assigned to corresponding assets 154 and simulations performed utilizing the Digital Twins 174. The data in the second group of data categories 232 may be stored in a database 244. In some embodiments, the database 244 may use network storage (e.g., associated with the cloud computing device 88) employed in the industrial network 152. As mentioned above, different types of data may be transmitted throughout the industrial network 152 via the common data pipeline. It should be noted that data may be pulled from a network (e.g., the industrial network 152) or a plant floor as inputs or outputs to the common data pipeline. For example, the data 102A may include the data in the first group of data categories 202 and the data 102B may include the data in the second group of data categories 232.

The first group of data categories 202 may include product data 204 and inventory data 206. The product data 204 may include manufacture data (e.g., asset serial number), lab test data, software data (e.g., initial OT firmware), and other data related to manufacturing of the assets 154. Certain product data 204 of the assets 154 may be used to initialize the corresponding Digital Twins 174. For example, the code repository system 166 may receive the product data 204 and generate the Digital Twins 174. In some embodiments, the remote support system 162 may use the product data 204 as reference data for troubleshooting and/or diagnostic purposes. The inventory data 206 may include part and/or component information related to the assets 154. For instance, the inventory data 206 may include part or component numbers that will be used for replacements of the parts or components during maintenance/repair tasks related to the assets 154. In some embodiments, the asset-based procedure system 164 may track the inventory data 206 with respect to other data (e.g., asset application data) to determine a risk to overall operations if respective parts are not adequately stored in inventory.

The first group of data categories 202 may also include application data 208, service data 210, and performance data 212. The application data 208 may include operational data, maintenance data, log data, video/audio feed data related to the assets 154. The application data 208 may be used by the remote support system 162 and the asset-based procedure system 164 to monitor the operations of the assets 154. The service data 210 may include service requests and tickets associated with the assets 154 having issues (e.g., hardware, software, or performance-related incidents or errors). The performance data 212 may include evaluation data (e.g., productivity data, error rate), overall equipment effectiveness (OEE) data, power consumption data, and the like. In some embodiments, the remote support system 162 may utilize the application data 208, service data 210, and performance data 212 for troubleshooting and/or diagnostic purposes.

The first group of data categories 202 may also include customer data 214 and other asset-related data 216. The customer data 214 may be generated from a customer device (e.g., the client device 160) connected to a control system (e.g., the industrial control system 22) controlling the assets 154. For example, the customer data 214 may include log files and video/audio feed data generated from the client device 160 prior to or during troubleshooting and/or diagnostic tasks performed by a customer or other party (e.g., a technician). The other asset-related data 216 may include an arrangement of the assets 154, such as a layout map of the assets 154 in the cell 18, the area 16, the factory 12 or factories 14, and the like. The other asset-related data 216 may also include hierarchy information of the assets 154, such as hierarchical levels of hardware and/or software implemented in the assets 154. In one embodiment, the customer data 214 and the other asset-related data 216 may be combined to be utilized for troubleshooting and diagnostic purposes. For example, the user (e.g., customer) may first determine a particular asset of the assets 154 that may cause issues/errors based on the layout map or hierarchical level of the assets 154, and then verify whether the particular asset is related to a root cause based on the log files and/or video/audio feed data collected by the client device 160 and tied to the particular asset.

As stated above, data in the first group of data categories 202 may be stored in the database 218. In some embodiments, the database 218 may include local databases (e.g., the database 80) used in the industrial automation system 10. In some embodiments, the database 218 may include local memory of systems/devices (e.g., the memory 36 of the industrial control system 22) and other storage components implemented at the edge 158. For example, certain data services (e.g., connected microservices) may be provided at the edge 158 using the database 218. Such data services may enable computations to be performed and data to be stored at locations where they are desired (e.g., closer to the assets 154), thereby improving response times and saving bandwidth.

The second group of data categories 232 may include codes 234, which may be computer-readable instructions executed by the remote support system 162, the asset-based procedure system 164, the cybersecurity system 168, the simulation system 170, other components to perform the techniques described herein. Additionally, the codes 234 may include workflows, simulations, machine-learning models, augmented reality experiences, drive parameters, drawings, schematics, cybersecurity functions, OT firmware, network diagrams, and the like that are utilized and/or provided by the remote support system 162, the asset-based procedure system 164, the cybersecurity system 168, and the simulation system 170.

The second group of data categories 232 may also include analytical data 236. The analytical 236 may be generated by the Digital Twins 174 using data transmitted from the assets 154. For example, the asset management system 150 may utilize the Digital Twins 174 to monitor and analyze the transmitted data from the assets 154. The analytical data 236 may provide insights for evaluating operational performance and diagnostics for troubleshooting of the assets 154. In some embodiments, the asset management system 150 may utilize the Digital Twins 174 to coordinate with the simulation system 170. As such, the analytical data 236 may include simulated data from the simulation system 170. For example, a client may use/supervise, via the client device 160 and through the asset management system 150, the Digital Twins 174 uniquely assigned to respective assets 154 to analyze collected asset-related data, to conduct simulations using a simulator of the simulation system 170 coordinated with the Digital Twins 174, to perform diagnostic evaluations and/or troubleshooting based on data analysis and simulations to determine the cause(s) of respective issues, and to update the codes 234 to enable appropriate solutions to resolve issues or errors.

Additionally, the second group of data categories 232 may include security data 238, Operational Technology (OT) data 240, and other system/cloud related data 242. The security data 238 may include identities of the assets 154, mappings between the assets 154 and the corresponding Digital Twins 174, code access credentials (e.g., temporary access code for a user to access the code repository system 166), cybersecurity alerts, and the like. The OT data 240 may include OT firmware stored in the Digital Twins 174. For example, the OT firmware stored in the Digital Twins 174 may include backups of the OT firmware 176 stored in the corresponding assets 154. In some embodiments the OT firmware stored in the Digital Twins 174 may include updated firmware (e.g., for fixing bugs) that may be used to update the corresponding OT firmware 176. The other system/cloud related data 242 may include system architecture and hierarchy information (e.g., regarding the asset management system 150) that may be used for tracking the asset-related data listed in the asset-related data categories 200. For example, the other system/cloud related data 242 may include a reference hierarchy related to the code repository system 166 and/or the asset management system 150. In some embodiments, the reference hierarchy may include hierarchical levels of hardware and/or software implemented in the asset management system 150. The reference hierarchy may be used to improve efficiencies of data tracking, searching, and querying associated with the asset-related data. In some embodiments, the other system/cloud related data 242 may include cloud infrastructure information (e.g., regarding to the industrial network 152) such as computing resources, network connectivity, communication protocols of the industrial network 152 that may be used to facilitate data communication and storage of the asset-related data.

As stated above, data in the second group of data categories 232 may be stored in the database 244. In some embodiments, the database 244 may include storage components implemented in the industrial network 152. For example, the database 244 may use Network-attached storage (NAS) data storage servers connected to the industrial network 152 to provide data access to a heterogeneous group of systems, devices, and/or clients. In some embodiments, certain data services (e.g., advanced data analysis, simulation, machine learning) may be provided in the industrial network 152 using the database 244. Such data services may utilize advanced computational power and data storage (e.g., cloud computing, sophisticated simulation model, big data mining) to generate more profound data that may be difficult to yield using data services provided at the edge 158 with the database 218.

It should be noted that the various asset-related data categories described above with regard to the asset-related data categories 200 are exemplary data categories. The asset-related data categories 200 may include additional or fewer categories as shown.

As mentioned previously, the asset management system 150 may create a number of Digital Twins 174 each representing a corresponding asset 154 in the industrial network 152. The asset management system 150 may enable a user to utilize a Digital Twin 174 to remotely monitor, control, support, and maintain the operations of a corresponding asset 154. In one embodiment, the asset management system 150 may allow the user to have access to certain code (such as operational code, maintenance code, troubleshooting code, and OT firmware) associated with a specific asset that may have issues. The user may use accessed code to identify an already existing Digital Twin 174 that has been assigned to the specific asset 154 as well as create a Digital Twin 174 and assign the Digital Twin 174 to the specific asset 154 (e.g., in cases in which there is not an already existing Digital Twin 174 corresponding to a particular asset 154). The user may use/supervise the Digital Twin 174 uniquely assigned to the asset 154 to analyze the collected asset-related data, to conduct simulations using a simulator coordinated with the Digital Twin 174, to perform diagnostic and/or troubleshooting functions based on data analysis and simulations to determine one or more causes of respective issues or errors, and to update code to enable appropriate solutions to the issues and errors. Accordingly, the asset management system 150 enables data associated with one entity (e.g., an operator of the industrial automation system 10, factory 12, or factories 14) to be received and analyzed by another entity (e.g., a user of the client device 160 or the industrial network 152) to perform services (e.g., diagnostic services, data management services, security services) related to the industrial automation system 10, factory 12, or factories 14.

Figure 11:
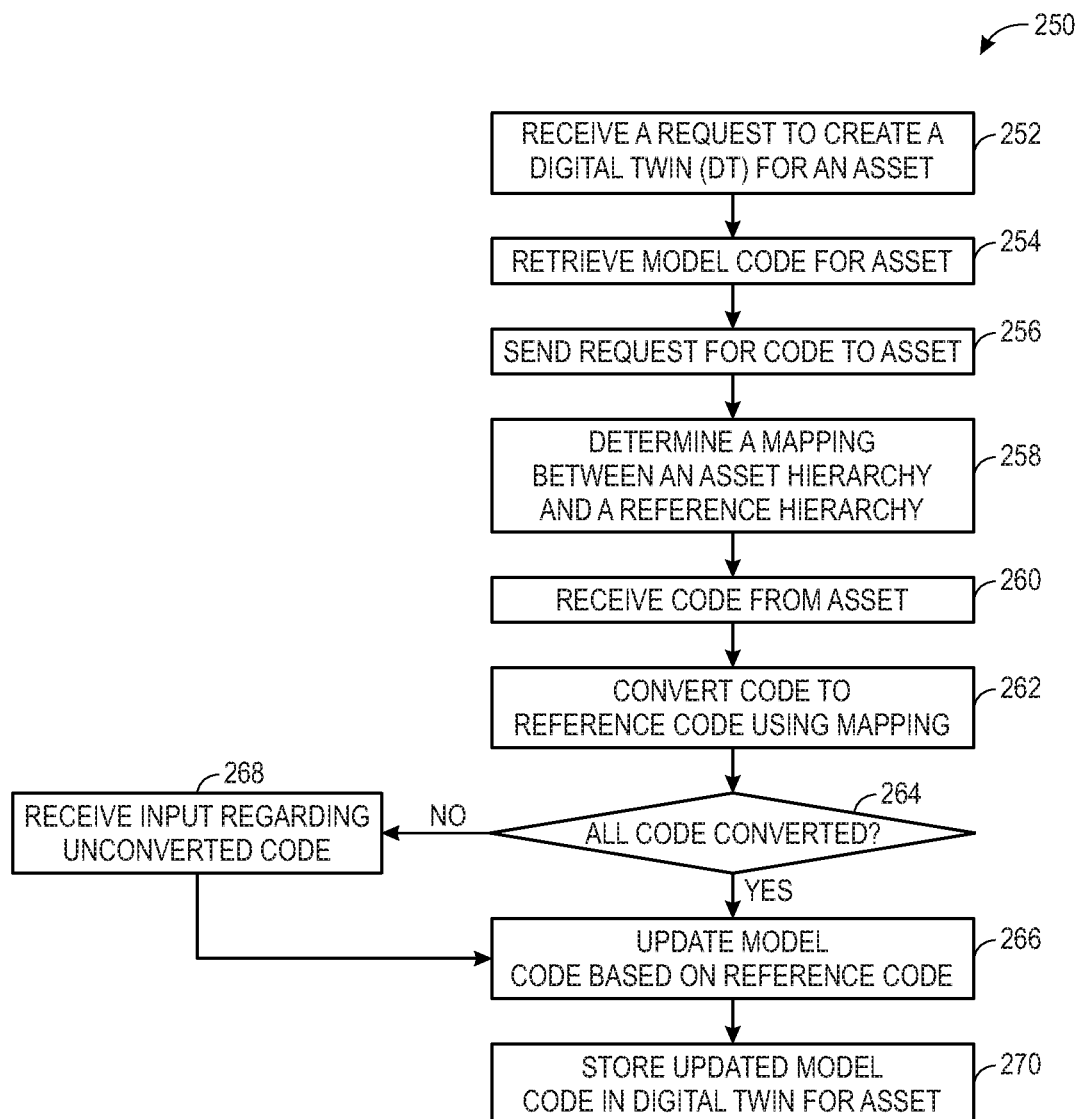
FIG. 11 illustrates a flow chart of a process for initializing a Digital Twin (DT) that may be employed in the asset management system of FIG. 9, in accordance with an embodiment presented herein.

With this in mind, FIG. 11 illustrates a flow chart of a process 250 that may be employed in the asset management system 150 of FIG. 9 to initialize the Digital Twin 174 prior to utilizing the Digital Twin 174 to manage operations of the corresponding asset 154. The process 250 may be an algorithm, program, or routine in the form of computer-readable instructions executable by one or more processors included in the asset management system 150 and stored on memory or storage included in, or accessible to, the asset management system 150. It should be noted that the operations described below with regard to the process 250 are exemplary operations and that, in other embodiments, the process 250 may include additional operations or omit one or more operations illustrated in FIG. 11. Additionally, in some embodiments, the operations of the process 250 may be performed in an order different than the order discussed below.

At process block 252, the code repository system 166 may receive a request to create a Digital Twin (DT) for an asset (e.g., the asset 154). In one embodiment, the request may be sent from a client via a computing device (e.g., client device 160) attempting to access the industrial network 152. In another embodiment, the request may be automatically generated by the asset management system 150 after an asset 154 connects to the industrial network 152 and is detected and verified by the asset management system 150 (e.g., based on asset identity or other cybersecurity protocols).

In response to receiving the request, the code repository system 166 may retrieve model code for the asset 154 (process block 254). In one embodiment, the model code may include template code specific to a type of asset or a group of assets to which the asset 154 belongs. The model code may additionally or alternatively include hierarchy information of the code repository system 166 and/or the asset management system 150.

The code repository system 166 may send a request for code to the asset 154 (process block 256). The requested code may include operational code specific to the asset 154. In some embodiments, the requested code may include input information from the client or a third-party (e.g., manufacturer of the asset 154). For example, the input information may include environmental settings and conditions for running and testing the code. The input information may facilitate monitoring, operating, maintaining, and diagnosing the asset 154 using the Digital Twin. In one embodiment, the request may be generated automatically by the asset management system 150. In one embodiment, the request may be generated by the client using the client device 160 connected to the asset management system 150.

Before receiving a response from the asset 154 (e.g., in response to receiving the request for code), the code repository system 166 may determine a mapping between an asset hierarchy and a reference hierarchy (process block 258). The asset hierarchy includes hierarchy information of the assets 154, such as hierarchical levels of hardware and/or software implemented in the assets 154. The requested code may have certain dependencies on the asset hierarchy (e.g., code running environment and settings, code testing environment and conditions). The reference hierarchy may be related to the code repository system 166 and/or the asset management system 150. In some embodiments, the reference hierarchy may include hierarchical levels of hardware and/or software implemented in the code repository system 166 and/or the asset management system 150. The reference hierarchy may be used by the code repository system 166 and/or the asset management system 150 to track, search, and query asset-related data (e.g., the codes 234). In some embodiments, the reference hierarchy may be used by the code repository system 166 to convert certain code from the asset hierarchy to the reference hierarchy, or to coordinate with the simulation system 170 to perform simulations for testing the code in a simulation environment. The asset hierarchy and the reference hierarchy may be similar or different.

In some embodiments, the mapping between the asset hierarchy and the reference hierarchy may be determined based on the metadata 104A included in the data 102A from the asset-side (e.g., from the assets 154) and the metadata 104B included in the data 102B from the system-side (e.g., from the Digital Twin 174). For example, the industrial network 152 may determine relationships (e.g., hierarchical relations) between the data related to the assets 154 (e.g., the data in the first group of data categories 202) and the data related to the Digital Twin 174 (e.g., the data in the second group of data categories 232) using the metadata 104A and 104B.

The code repository system 166 may receive code from the asset 154 (process block 260). To improve efficiencies, in some embodiments, a subset of the code associated with the asset 154 may be selected based on the knowledge specific to the asset 154. This may reduce the code used to initialize the Digital Twin 174. Furthermore, in some embodiments, the code repository system 166 may determine the mapping after receiving the code from the asset 154.

After receiving the code from the asset 154, the asset management system 150 may convert received code to reference code using the mapping (process block 262) generated at process block 258. For example, the conversion may include modifying the received code written under the asset hierarchy to the reference code compatible to the reference hierarchy. In some cases, the client performing work related to the asset 154 (e.g., troubleshooting an issue or error) may be familiar with the asset hierarchy instead of the reference hierarchy. As such, the conversion of the code may reduce coding effort of the client and facilitate a code transfer process between the asset 154 and the code repository system 166.

At decision block 264, the code repository system 166 may determine whether all received code from the asset 154 have been converted to reference code. If all received code is determined to have been converted, the code repository system 166 may update the model code based on the reference code (process block 266). In one embodiment, the code repository system 166 may perform comparison operations to determine differences between the model code and the reference code. Based on the determined differences, the code repository system 166 may modify the model code to incorporate updates from the asset 154. The code repository system 166 may record code update(s) in log files or other suitable manners (e.g., a ledger or block chain).

If, at decision block 264, the code repository system 166 determines that a portion of the received code from the asset 154 has not been converted, the code repository system 166 may receive input regarding unconverted code (process block 268). The input definition may include certain information related to the asset hierarchy that may not be captured when determining the mapping between the asset hierarchy and the reference hierarchy. For example, the original asset hierarchy may be a standard hierarchy recognizable (e.g., based on certain identifiers in asset code) to other entities (e.g., the code repository system 166). Through a course of operations, the original asset hierarchy may be modified (e.g., by a third-party entity). The modifications may not be documented (e.g., in the asset code), which may cause the modified asset hierarchy to be unrecognizable to other entities. In one embodiment, the client may provide the input related to such modifications to the code repository system 166. In another embodiment, metadata (e.g., metadata 104A) associated with data (e.g., data 102A) from an asset 154 may be utilized. For example, after the asset 154 has been deployed with initial code based on an original asset hierarchy, a third-party entity updated the initial code (e.g., installed a software patch). Such updates may not have been documented in the updated code. As a result, the received code from the asset 154 was determined by the code repository system 166 as unconverted. Accordingly, a notification may be sent to the client for providing the input regarding the unconverted code. The client may add the code update information into the metadata 104A included in the data 102A, which may be sent to the code repository system 166 for updating the model code based on the reference code. That is, the input regarding the unconverted code may enable the code repository system 166 to convert the unconverted code to the reference code and update the model code based on the reference code, as described at process block 266.

At process block 270, the code repository system 166 may store updated model code in the database 244 and create the Digital Twin based on the updated model code. This operation finalizes the process 250 and enables the Digital Twin 174 to be used by the asset management system 150 for monitoring, operating, maintaining, and diagnosing the asset 154 the Digital Twin 174 corresponds to.

Figure 12:
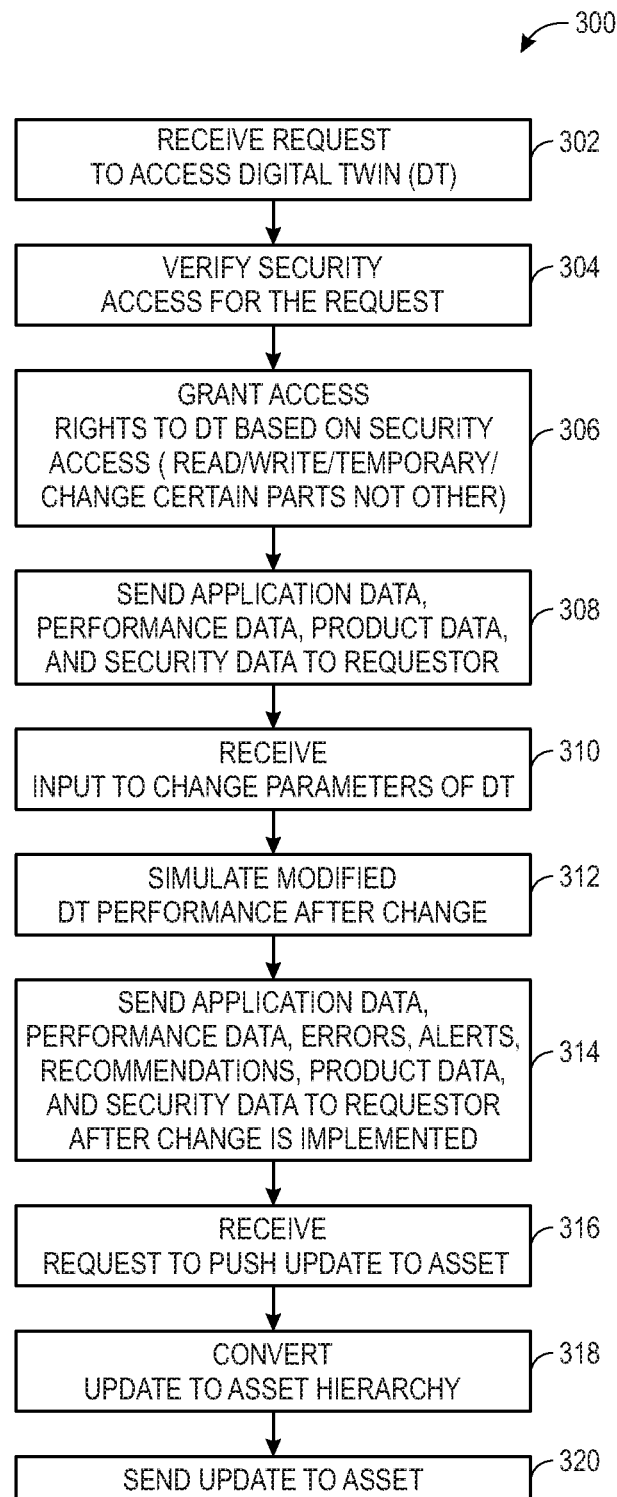
FIG. 12 illustrates a flow chart of a process for operating a Digital Twin (DT) that may be employed after the Digital Twin initialization process of FIG. 11, in accordance with an embodiment presented herein.

After initialization, the Digital Twin 174 may be used by the asset management system 150 to monitor operations of the asset 154, analyze data collected from the asset 154, coordinate with the simulation system 170 to run simulations or diagnostics for given issues based on collected data, and update corresponding code to enable appropriate solutions to the issues to be determined and implemented. Bearing this in mind, FIG. 12 illustrates a flow chart of a process 300 for operating the Digital Twin 174 that may be employed by the asset management system 150 (e.g., after performing the process 250 of FIG. 11) for such purposes. The process 300 may be a process that one or more processors included in the asset management system 150 implements by executing computer-readable instructions stored on memory or storage included in, or accessible to, the asset management system 150. It should be noted that the operations described below with regard to the process 300 are exemplary operations and that, in other embodiments, the process 300 may include additional operations or omit one or more operations illustrated in FIG. 12. Additionally, in some embodiments, the operations of the process 300 may be performed in an order different than the order discussed below.

At process block 302, the code repository system 166 may receive a request to access a Digital Twin 174. For example, the request may be sent from a computing device (e.g., client device 160) used by a requestor (e.g., a client) who may access the industrial network 152 to resolve or diagnose problems associated with an asset 154 to which the Digital Twin 174 is assigned. In other words, the client device 160 may request access to a Digital Twin 174 corresponding to a particular asset 154, such as a component of the industrial automation system 10.

In response to receiving the request to access the Digital Twin 174, the code repository system 166 may verify a security access for the request (process block 304). For example, the code repository system 166 may request identity information from the requestor or utilize identity information included in a received request to determine whether to provide the requesting device (e.g., client device 160) access to the Digital Twin 174. For instance, the code repository system 166 may cross-reference the identity information against credential-related information associated with the Digital Twin 174 (e.g., data indicating user accounts or electronic devices that have access to a particular Digital Twin 174) included in the security data 238 stored in the database 244, or against other security information (e.g., cybersecurity data stored in the cybersecurity system 168 including a list of entities that have caused security alerts/warnings in the past).

After verifying the security access for the request, the code repository system 166 may grant the requesting device (e.g., client device 160) access rights to the Digital Twin 174 (process block 306). In some embodiments, the code repository system 166 may create a temporary permission for the client device 160 to access certain parts of the code 234 for troubleshooting or analysis. For example, the temporary permission may allow the client (e.g., a remote support technician) to utilize the client device 160 to read, write, and/or temporarily modify the certain parts of the code 234 accessible to the client device 160. Accordingly, the client device 160 may be used by the remote support technician to monitor aspects of the operation of the asset 154 for a period of time without compromising the security of the stored code/data stored on the database 244 or giving unlimited access to the secure code/data.

To enable a user of the client device 160 to utilize the Digital Twin 174 to resolve or diagnose problems associated with the asset 154, the client device 160 may request certain asset-related data from the code repository system 166. The code repository system 166 may receive such a request, and, in response to receiving the request, send certain asset-related data such as application data, performance data, product data, and security data to the client device 160 (process block 308).

As a user of the client device 160 interacts with the Digital Twin 174, the code repository system 166 may receive an input to change parameters of the Digital Twin 174 (process block 310). For example, the user of the client device 160 may determine that certain parameters of the Digital Twin 174 should to be changed (e.g., to help resolve or diagnosing the problems associated with the asset 154). These parameters may include code (e.g., code 234) running environment and settings, code testing environment and conditions, and the like. The user may provide user input to the client device 160 to modify the parameters of the Digital Twin 174, and the client device 160 may send a request to the code repository system 166 to modify the parameters.

In response to receiving request to change parameters of the Digital Twin 174, the code repository system 166 may simulate the performance of the modified Digital Twin 174 after changing the parameters (process block 312). For example, the code repository system 166 may request the simulation system 170 to use a simulator of the simulation system 170 to run simulations based on the changed parameters indicated by the input. Accordingly, the changed parameters of the Digital Twin 174 may be emulated in a cloud environment to determine feasibility and applicability.

Based on the simulations, the code repository system 166 may send application data, performance data, simulation errors and/or alerts received from the simulation system 170, recommendations, product data, and security data to client device 160 (process block 314). That is, the code repository system 166 may provide data to the client device 160 regarding the results of, or determinations made based on, one or more simulations based on the Digital Twin 174 having the modified parameters. The user of the client device 160 may evaluate the simulation results based on the received data to determine the feasibility and applicability of the previously submitted modifications.

In some embodiments, the client device 160 may have temporary or limited access to certain parts of the simulator during the simulations (e.g., to enable a user to view simulation results via a user interface in the client device 160). In some embodiments, the user of the client device 160 may have access rights (e.g., temporary or limited permission) to modify certain aspects of the simulations and interact with the simulator in a real-time manner. For example, the user may adjust, based on simulation results, some of the code running environment and settings to validate feasibility of the adjusted environment or settings. The user may send recommendations for adjusting the modified parameters of the Digital Twin 174 based on the simulation result.

After evaluating the simulated performance for the Digital Twin 174 having the modified parameters, the code repository system 166 may receive a request to push an update to the asset 154 (process block 316). For example, the request may be sent, via the client device 160, from a client who evaluated the simulations and would like the updated asset code related to the changed parameters of the Digital Twin 174 to be applied to the asset 154.

In response to the request to push update to the asset 154, the code repository system 166 may convert the updated asset code to an asset hierarchy (process block 318). For example, the updated asset code may be converted based on the mapping between the asset hierarchy and the reference hierarchy, similar to the process described in FIG. 11. The conversion may include modifying the updated asset code written under the reference hierarchy to code compatible to the asset hierarchy. The conversion of the code may reduce coding effort of a client who may perform work related to the asset 154 (e.g., troubleshooting an issue or error) but may not be familiar with the reference hierarchy, thereby facilitating a code transfer process between the code repository system 166 and the asset 154.

After converting the update to the asset hierarchy, the code repository system 166 may send an update to the asset 154 (process block 320). The asset 154 may perform operations based on the updated code. For example, the asset 154 may perform a new routine, operate according to a new mode of operation, perform a different operation, or perform a previous operation in a different manner, for instance, to correct an issue or address an error associated with the asset 154. Accordingly, the operations performed based on the updated code enable problems or errors associated with the assets 154 to be resolved.

As mentioned above, the simulation system 170 may include various emulation techniques and services that may be utilized to assist users with various stages of the lifecycle of the industrial automation system 10. That is, emulation may be used to assist the users in designing the industrial automation system 10, starting operations of the industrial automation system 10, or modifying the industrial automation system 10 (e.g., changing components within the industrial automation system 10, an arrangement of the components within the industrial automation system 10, or operations performed by the components of the industrial automation system 10). In addition, emulation services may be utilized to train technicians and other personnel who may service the industrial automation system 10. Further, emulation may be used for troubleshooting problems associated with the industrial automation system 10 and improving processes that are implemented by the industrial automation system 10. As such, emulation may be used throughout the lifecycle of industrial automation system 10 to improve operations of the industrial automation system 10.

Furthermore, emulations may provide tools to help the users in designing, training, maintaining, and improvement stages of the lifecycle of the industrial automation system 10. For example, during the design stage, an emulator may provide simulations of operations to enhance the time to put products into the market, to start up a new facility, or the like. In the training stage, the emulator may provide simulated virtual reality or augmented reality training to help users learn how to operate the various types of equipment. The emulator may also assist users maintain systems and equipment by providing troubleshooting or introducing an alert into the system. The improvement stage may be assisted by the emulator providing recommendations with regard to improved operating parameters based on simulations performed for the current system. That is, the emulator may automatically make test code changes and determine the effectiveness of the test code in the emulation environment.

In some embodiments, emulations may be used to test how threats are assessed and resolved in a number of organizations. In this way, each organization may view its relative performance with regard to resolving a threat, as compared to its peers. For example, the cybersecurity system 168 may coordinate a number of data sources (e.g., the assets 154, the edge devices 156, the client device 160, the remote support system 162, the asset-based procedure system 164, and the code repository system 166) associated with different organizations that may perform asset-related data analysis to assess cybersecurity threats (e.g., hacking attempts, data breaches, malware, phishing, denial of service attack, attacks on IoT devices, man-in-the-middle attack, Domain Name System (DNS) tunneling, SQL injection). The cybersecurity system 168 may collect log files from different organizations via communications with relevant systems (e.g., the industrial control system 22, the edge computing device 86, the cloud computing device 88, the computing devices 90, assets 154, and edge devices 156) in response to detecting a cybersecurity threat or issuing an alert. Each of the collected log file may include a list of events (e.g., security incidents) that occur in an operating system of software and corresponding reactions of the operating system in response to the events. In one embodiment, the cybersecurity system 168 may request the simulation system 170 to use a simulator to run simulations in a cloud environment based on the security incidents and corresponding reactions recorded in the log files collected from different organizations. In another embodiment, the cybersecurity system 168 may coordinate with the code repository system 166 to request the simulation system 170 to run simulations based on the security incidents and the code 234 corresponding to the asset 154. As such, the simulations may be used to test how threats are assessed and resolved by different organizations. Each organization may have access to view its relative performance with regard to resolving a similar or related security threat, as compared to its peers.

Figure 13:
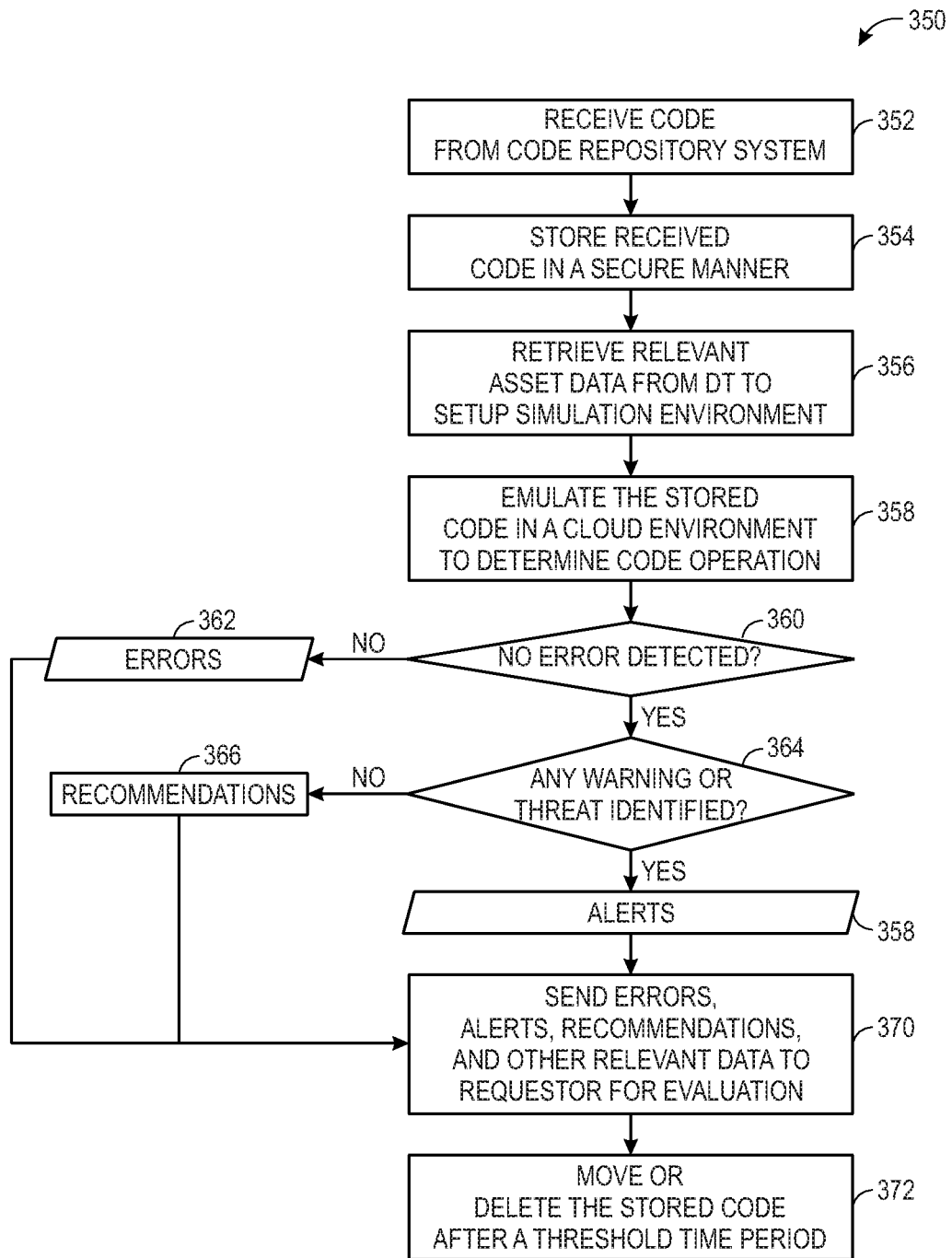
FIG. 13 illustrates a flow chart of a process for simulating an asset code that may be employed in the asset management system of FIG. 9, in accordance with an embodiment presented herein.

Keeping the foregoing in mind, FIG. 13 illustrates a flow chart of a process 350 for simulating an asset code that may be employed in the asset management system 150 of FIG. 9. For example, the process 350 may be implemented by the simulation system 170 to simulate asset code performance after receiving code updates or new code. In one embodiment, the code repository system 166 may use a Digital Twin 174 to coordinate with the simulation system 170 to run simulations based on the received code. After the simulations, the simulation system 170 may send simulation results to the code repository system 166. In one embodiment, the simulation system 170 may send the simulation results and other analytical data to a user (e.g., a user of the client device 160) for evaluation. In another embodiment, the user may have temporary or otherwise limited access to view certain simulation results (e.g., via a user interface in the client device 160 communicatively connected to the Digital Twin 174). In some cases, the user may have temporary or limited rights to modify certain aspects of the simulations and interact with the simulator in a real-time manner. The process 350 may be an algorithm, program, or routine in the form of computer-readable instructions executable by one or more processors included in the asset management system 150 and stored on memory or storage included in, or accessible to, the asset management system 150. It should be noted that the operations described below with regard to the process 350 are exemplary operations and that, in other embodiments, the process 350 may include additional operations or omit one or more operations illustrated in FIG. 13.

Additionally, in some embodiments, the operations of the process 350 may be performed in an order different than the order discussed below.

At process block 352, the simulation system 170 may receive code (e.g., updated or new code) from the code repository system 166. The received code may be related to software updates, bug corrections (e.g., in an OT firmware), asset operational testing, asset performance testing, asset maintenance testing, troubleshooting, and the like.

After receiving the updated code, the simulation system 170 may store the received code in a secure manner (process block 354). For instance, the simulation system 170 may have a database for storing the received code (e.g., database 244 or a database included in, or accessible to, the industrial network 152. In one embodiment, the stored code may be temporarily locked from being edited during a simulation process. However, in some cases, certain users (e.g., users with administrator privileges) may have permission to modify the stored codes during the simulation process.

In addition to receiving the updated codes, the simulation system 170 may retrieve relevant asset data from a Digital Twin 174 to set up a simulation environment (process block 356). For example, the simulation environment may be similar to a real operational environment where the asset may be deployed (e.g., the factory 12, the area 16, or the cell 18). The Digital Twin 174 may include the relevant asset data from the asset 154 through the asset management system 150. In some embodiments, the Digital Twin 174 may receive certain input information related to the asset 154 from a client (e.g., technician) who may be familiar with the real operational environment. For example, the input information received from the technician may include code running environment and settings, code testing environment and conditions, and the like. The input information may facilitate setting up the simulation environment provided by the simulation system 170.

After setup of the simulation environment is completed, the simulation system 170 may emulate the stored codes in a cloud environment to determine code operation (process block 358). In one embodiment, the simulation system 170 may perform emulations by utilizing a cloud computing system included in the simulation system 170, one or more cloud computing systems outside the simulation system 170, or combinations thereof. The emulations may include data and/or model-based simulations, machine learning, other suitable modeling/simulation methods. The simulation system 170 may use the retrieved relevant asset data from the Digital Twin 174 as an input. In some embodiments, the simulation system 170 may use other data as additional inputs. For example, the additional inputs may include historical simulation data conducted previously for the same asset. In some cases, the additional inputs may include simulation data from other Digital Twins 174 that may be assigned to other assets having same/similar type as the asset and deployed in the same/similar operational environment as the asset.

The simulation system 170 may monitor the progress of a simulation. In one embodiment, the simulation may be monitored in real-time. In another embodiment, based on scopes of the simulation (e.g., input data size, model size) and computational resources involved (e.g., CPUs, storage, network speed), the simulation system 170 may determine an estimated turnaround time for the simulation. Based on the estimated turnaround time, the simulation system 170 may check the progress of the simulation according to a pre-determined time schedule (e.g., every 5 minutes, 30 minutes, hour, day, or the like). In some cases, the client may have temporary or limited rights to monitor the progress of the simulation in real-time or according to the pre-determined time schedule.

At decision block 360, the simulation system 170 may determine whether any error has been detected during the simulation. For example, the error may be associated with a failed simulation yielding error message, a completed simulation with unexpected simulation result beyond current simulation scope, or an ongoing simulation with excessive runtime than estimated. The simulation system 170 may generate errors 362. The errors 362 may include the error message or otherwise provide information regarding unexpected simulation results, or data generated during simulation runtime.

If no error has been detected during the simulation, the simulation system 170 may determine whether any warning or threat has been identified (decision block 364) during the simulation. For example, the simulation system 170 may check log files associated with the simulation progress to identify the warning or threat that may occur in the simulation. If no warning or threat is identified, the simulation system 170 may generate recommendations 366. The recommendations 366 may include information (e.g., comparisons between current simulation and historical simulation results using different codes) that may facilitate evaluating the simulation result.

If, at decision block 364, any warning or threat is identified, the simulation system 170 may generate alerts 368. For example, the alerts 368 may include text messages, emails, audio alerts, video alerts, haptic feedback, or combinations thereof. The alerts 368 may include certain asset performance-related simulation data that may also help a user (e.g., a client) for evaluating the simulation result.

The simulation system 170 may send the errors 362, the alerts 368, the recommendations 366, and other relevant data to a requestor for evaluation (process block 370). The requestor may be a technician who sent a request (e.g., via the client device 160) to simulate the performance of the asset using the updated codes. Based on the evaluation, the requestor may determine whether the updated codes are feasible (e.g., fit to the implemented by the assets 154 to perform a particular automation process within the industrial automation system 10 or to correct an issue or error within the industrial automation system 10).

At process block 372, the simulation system 170 may move or delete the stored code after a threshold time period. The moving or deletion of the stored codes may reduce the code maintenance complexity and/or increase the data security. In one embodiment, after the threshold time period (e.g., hours, days, weeks, years), the stored code may be moved to the database 244 to reduce code maintenance tasks in the simulation system 170. In another embodiment, after the threshold time period, the stored code may be deleted to reduce copies of the code in the asset management system 150, thereby reducing data exposures to potential cybersecurity threats (e.g., hacking attempts, data breaches, malware)

Connected Microservices and Industrial Information Solution

As mentioned previously, the asset management system 150 may use certain electronic devices to enable microservices to facilitate data transmissions and improve data security in the industrial automation system 10 and the industrial network 152. For example, the asset management system 150 may enable connected microservices or a microservice architecture between the edge 158 and the industrial network 152 using edge devices (e.g., edge computing device 86, edge devices 156) and receiving devices (e.g., cloud computing device 88, computing device 90). Such connected microservices may facilitate data transmissions associated with the asset-related data and add enhanced protections to improve data security during data transmissions. That is, the microservices may provide a service-oriented architecture (SOA) structure that facilitates collection and communication of data via devices within the industrial network 152. In one embodiment, the connected microservices (e.g., programmed applications, consumers) may receive unclassified datasets from the edge 158 and the industrial network 152. The connected microservices may include analytical software that acts as a router and/or a subscription service. The connected microservices may analyze the dataset to determine a category or classification for the dataset for use in the industrial network 152. For example, the connected microservices may route the dataset to a final location (e.g., the receiving devices) based on the analysis, route the dataset to different programmed applications, segment the dataset for storage and use, or perform some other suitable operation on the dataset based on the determined category or classification. The connected microservices may include programming structures that provision an overall software application (e.g., overall mapping/routing application of the industrial network 152) via a collection of the various configuration files (e.g., the connected microservice configuration file defining an analytical function of the connected microservice). The connected microservices may operate as a collection of generally coupled software (e.g., micro-software) applications that, when combined together, perform the function of the overall software application. The connected microservices may provide suitable communication protocols to facilitate communications between micro-software applications. In some embodiments, the connected microservices may enable an individual (e.g., a technician) to perform onsite tasks based on analytic results received from a remote system to troubleshoot or diagnose anomalies, issues, or errors associated with certain components (e.g., asset 176) of the industrial automation system 10. For example, the technician may receive an indication of an anomaly associated with an asset 176. The technician may use a computing device (e.g., laptop) to download data regarding the asset 176 and send the collected data to a remote system (e.g., remote support system 162, cybersecurity system 168). The remote system may receive the asset-related data via the common data pipeline, run data analysis and simulations, and determine a root cause for the anomaly. The technician may then receive a service package for resolving/avoiding the anomaly from the remote system and upload the service package, such that a client (e.g., operator of the industrial automation system 10) may have an add-on micro-service including the service package stored on the control system for operating the asset 176.

Figure 14:
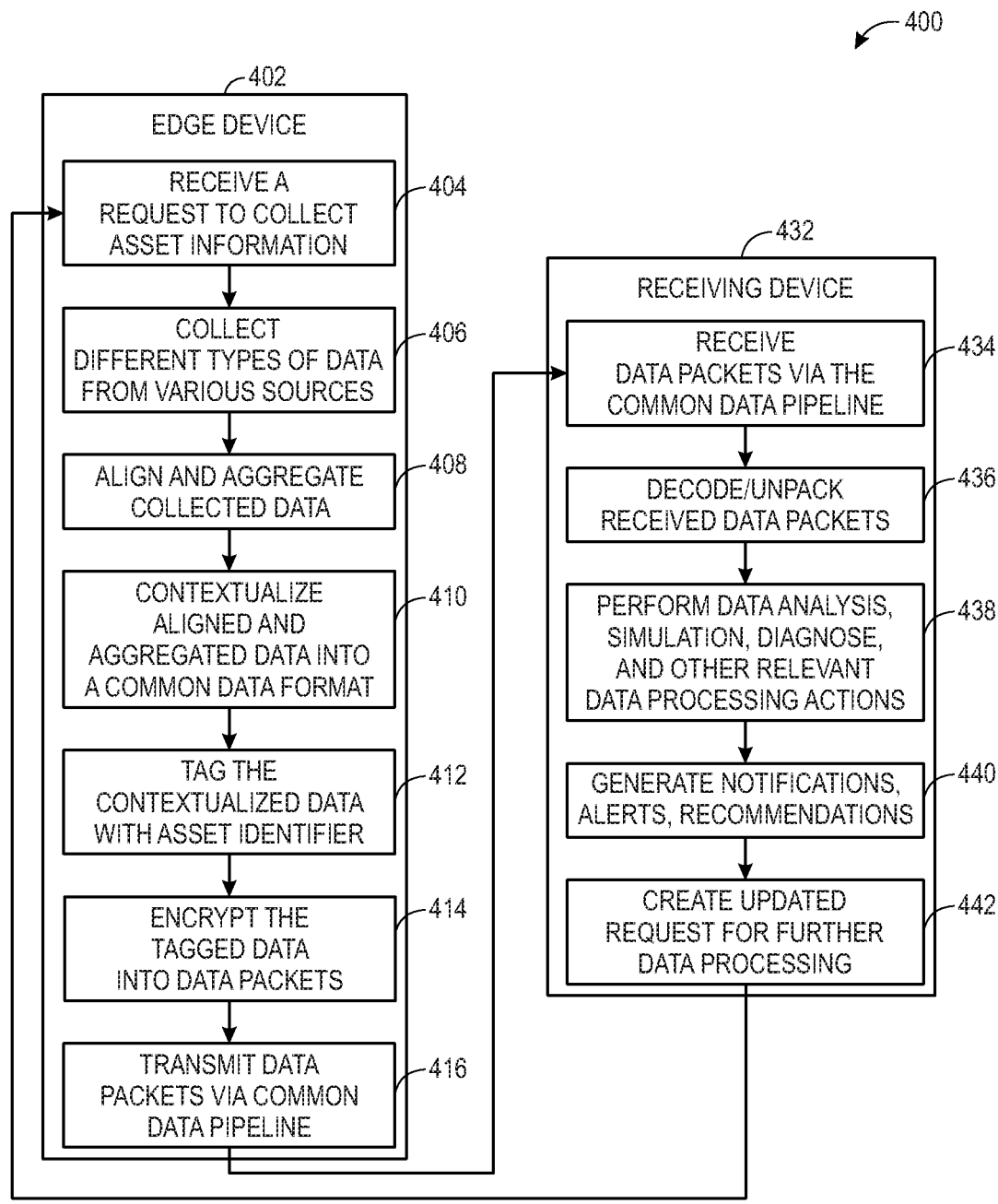
FIG. 14 illustrates a flow chart of a process for collecting and providing asset data through the asset management system of FIG. 9, in accordance with an embodiment presented herein.

Bearing this in mind, FIG. 14 illustrates a flow chart of a process 400 for providing connected microservices through the asset management system 150 of FIG. 9 for such purposes. The process 400 may be a process that one or more processors included in the asset management system 150 implements by executing computer-readable instructions stored on memory or storage included in, or accessible to, the asset management system 150. It should be noted that the operations described below with regard to the process 400 are exemplary operations and that, in other embodiments, the process 400 may include additional operations or omit one or more operations illustrated in FIG. 14. Additionally, in some embodiments, the operations of the process 400 may be performed in an order different than the order discussed below.

In some embodiments, the common data pipeline may be built on top of an existing communication infrastructure associated with the industrial automation system 10. For example, the existing communication infrastructure may include a wired connection, wireless connection, or both that communicatively couples the edge computing device 86, the cloud computing device 88, and the computing devices 90 to one another. To avoid adding another communication infrastructure in a crowded industrial environment, the common data pipeline may inherently maintain an integrity of the data transmissions without using a separate system (e.g., a separate security system) to verify the accuracy and security of the asset-related data. To incorporate the common data pipeline into the existing communication infrastructures, an edge device (e.g., edge computing device 86) and a receiving device (e.g., cloud computing device 88) may be utilized to provide connected microservices for facilitating data transmissions with improved data security in the industrial automation system 10 and the industrial network 152. Each of the edge device and the receiving device may provide a series of microservices that are connected to one another. For example, as illustrated in FIG. 14, the edge device may provide a series of microservices 402, which may generate data (e.g., encrypted data packets) to use as input for another series of microservices 432 provided by the receiving device.

At process block 404, the edge device may receive a request to collect asset information associated with an asset (e.g., asset 154). Such asset information may include data indicative of an identity of the asset 154, product data 204, inventory data 206, application data 208, service data 210, performance data 212, customer data 214, and other asset-related data 216. In one embodiment, the request may be sent from the Digital Twin 174 assigned to the asset 154. By monitoring operations of the asset 154, the Digital Twin 174 may identify an issue (e.g., cybersecurity alert) or error (operational error) associated with the asset 154 and send the request to the edge device to collect the asset information.

In response to receiving the request for collecting the asset information, the edge device may collect different types of data from various sources (process block 406). For example, the edge device may send a notification to a computing device of a field technician requesting that the technician visit the industrial automation system 10 to perform onsite troubleshooting and/or diagnostic tasks related to the issue of error identified by the Digital Twin 174. The edge device may identify the technician based on a proximity to the industrial automation system 10, an expertise of the technician, or the like. The field technician may send commands to the edge device via the computing device to configure the edge device (e.g., modify or reprogram operational code) such that the edge device may query the database 218 to collect the product data 204, application data 208, performance data 212, and other asset-related data that may be stored in the database 218. In some embodiments, the edge device may communicate with a client device (e.g., the client device 160) to collect the customer data 214 that may include log files and video/audio feed data generated from the client device 160 prior to or during onsite troubleshooting and/or diagnostic tasks performed by the field technician. The collected data may include different types and/or formats of asset-related data. For example, the collected data may include IoT data, log files, asset information, software, inventory data, video/audio feed data, and the like. In addition to sending a notification to the computing device, in some embodiments, the edge device may automatically identify the different types of data related to the asset 154 and collect the data in accordance with the techniques described above.

After collecting the different types of data from various sources, the edge device may align and aggregate the collected data (process block 408). For example, the edge device may collect service data (e.g., software bug corrections) from both the database 218 and the client device 160. The collected service data may be aligned based on the identity of the asset 154. Further, the aligned data may be aggregated into a single data set related to the software bug corrections applied to the asset 154 during troubleshooting or diagnostic tasks performed by the technician using the client device 160. The data aggregation may exclude duplicated data in the collected service data.

At process block 410, the edge device may contextualize (e.g., format) aligned and aggregated data into a common data format. As described previously, data generated from operations of the asset 154 may be combined in common data packets or protocols transmitted via the common data pipeline. In some embodiments, the edge device may be configured by a field technician during onsite troubleshooting or diagnostic tasks to contextualize the received data before transmitting the data via the common data pipeline. For example, the edge device may contextualize the aligned and aggregated data with respect to different scopes or hierarchical levels as described above with reference to FIG. 1. In some embodiments, the edge device may be able to further contextualize data or enhance data packages (e.g., groups of data packets) generated and provided by the industrial automation system 10 (e.g., data packages included in the data 102A). In some embodiments, the edge device may employ the connected microservices to facilitate encoding and/or packing the aligned and aggregated data. In other embodiments, the edge device may send a request to the computing device associated with the field technician requesting that the field technician provide configuration data related to aggregating data collected from the various sources. That is, the request may include a selection or indication of types of data that the field technician prefers to receive, a manner in which the data is aggregated, a selection of the data sources, and other configurable parameters for collecting data.

After contextualizing the aligned and aggregated data, the edge device may tag the contextualized data with an asset identifier (process block 412), which may be generated based on the identity of the asset 154. That is, the contextualized data may be tagged or organized in a manner to enable the receiving device to subscribe to the data output by certain sources or any type of data present on the common data pipeline. For example, data related to preventative maintenance may be provided as alerts via the common data pipeline using subscription services. As such, as data is made available via microservices or the like, the data may be tagged with the asset identifier and may include a payload representing raw data that contains the collected asset information associated with the asset 154.

At process block 414, the edge device may encrypt the tagged data into encrypted data packets. For example, the tagged data may be organized or aggregated with other available data (e.g., additional identification information or added security protocols) for encryption. After data encryption, the edge device may transmit the encrypted data packets via the common data pipeline (process block 416).

The receiving device may receive the encrypted data packets via the common data pipeline (process block 434). In some embodiments, the receiving device may receive the encrypted data packets via a subscription to the data output by the sources (e.g., the industrial automation system 10) or any type of data present on the common data pipeline. As such, the microservices 432 may monitor the data tags of data packets traversing the common data pipeline and pull the data packets that have data tags that correspond to the subscribed data tags. Alternatively, the microservices 402 may automatically send the data packets to the microservices 432 in light of the subscription services.

At process block 436, the receiving device may decode and unpack received data packets. For example, the receiving device may employ microservices to facilitate decoding and unpacking the received data packets. The decoding and unpacking may be based on the asset identifier. The decoded and unpacked data may include the payload representing raw data that contains the collected asset information associated with the asset 154.

Based on the decoded and unpacked data, the receiving device may perform data analysis, simulation, diagnose, and other relevant data processing actions (process block 438). For example, the receiving device may access the Digital Twin 174 assigned to the asset 154 to analyze received data, to coordinate with the simulation system 170 to run simulations or diagnostics for given issues based on received data, and to update corresponding parameters or code to enable appropriate solutions to the issues to be determined and implemented. In some embodiments, a field technician performing onsite troubleshooting or diagnostic tasks may remotely (e.g., via the industrial network 152) access the Digital Twin 174 that mirrors the asset 154 to run simulations for the given issues. As such, the Digital Twin 174 may be used to simulate the effects of the issues over time, simulate the effects of taking certain actions, simulate the effects of adjusting certain operating parameters, and the like. In addition, the field technician may remotely access multiple Digital Twins 174 associated with different assets 154 that may be related to the given issues and combine multiple simulations of the Digital Twins 174 into a large simulation for enhanced analysis and diagnosis. That is, the multiple Digital Twins 174 may be used to simulate the effects of the issues over multiple assets over time, simulate the effects of taking certain actions for the multiple assets, simulate the effects of adjusting certain operating parameters for the multiple assets, and the like.

At process block 440, the receiving device may generate notifications, alerts, and recommendations based on analytic results, simulation results, diagnostic results, and other relevant results generated from the process block 438. In an embodiment, a certain portion of code related to operating the asset 154 may be updated. The receiving device may access the Digital Twin 174 to monitor operations of the asset 154 after the code updates. The Digital Twin 174 may identify an issue or error associated with the asset 154 and report the identified issue or error to the receiving device. The receiving device may access the Digital Twin 174 to coordinate the simulation system 170 to simulate asset performance after code updates. Based on the simulated asset performance, the receiving device may determine whether the identified issue or error is related to the code updates. If the code updates are determined to be related to the identified issue or error, the receiving device may generate notifications, alerts, and recommendations and send them to relevant systems (e.g., the industrial control system 22, the asset management system 150) and/or devices (e.g., the edge device 156, the client device 160). For example, an alert may be automatically sent to the client device 160 to generate a visualization or audbile notification to notify a user of the client device 160.

In addition to the code updates, other changes may also cause the identified issue or error. For example, an original asset hierarchy may be modified by a third-party entity. The modifications may not be documented in an asset code, which may be based on the original asset hierarchy. When the asset code is updated and implemented to the asset 154, it may cause the identified issue or error due to the modified asset hierarchy that is incompatible with the updated asset code. Therefore, the receiving device may create an updated request for further data processing (process block 442) to determine additional changes that may cause the identified issue or error. The updated request is sent to the edge device to initiate a new series of microservices.

As described previously, the Digital Twin 174 may be used to monitor operations of the asset 154 to which the Digital Twin 174 is designed to mirror or mimic. Through operation monitoring, the Digital Twin 174 may detect an anomaly associated with the asset 154. The identified anomaly may be used to initiate a microservice solution or generate a software package that may be used to solve potential issue(s) associated with the anomaly. The microservice solution may include a set of instructions or software packages that are designed to resolve a particular issue or problem. For example, the identified anomaly may correspond to a temperature value associated with a motor exceeding a threshold, and the microservice solution may include a software package that causes a controller of a motor drive that controls the motor to decrease the speed at which a shaft of the motor rotates. That is, the microservice solution may provide a specific set of instructions that a technician may implement or a software package that may be uploaded to the controller of the motor drive to cause the motor drive to reduce the speed of the motor. In this way, the microservice solution may provide a solution to be implemented for a particular component that may not be related to the originally detected anomaly.

With this in mind, in some embodiments, an individual (e.g., a field technician) may go onsite (e.g., go into a client system) to perform certain field tasks (e.g., routine maintenance tasks) that are designed to troubleshoot or resolve the issue associated with the detected anomaly. Prior to implementing the field tasks, the field technician may identify a data model (e.g., Digital Twin 174) that simulates the operations of a specific asset (e.g., asset 154) after the field tasks are performed. The field technician may utilize the data model to actively monitor the operations of the client system (e.g., the industrial automation system 10) and identify any additional anomalies that may occur within the specific asset or within other assets as a result of performing the field tasks. Through the data model, the field technician may determine or identify specific issues related to the original anomaly and use the identified issues to collect asset-related data from the common data pipeline for other assets that may be related to the identified issues. The asset-related data may allow the field technician to extract relevant data that is useful for resolving the issues related to the anomaly. An add-on microservice software package containing solutions to the issues may then be uploaded to a computing device or controller related to operating the asset associated with the original anomaly or to operating other assets related to the identified issues. The microservice software package may be designed to resolve a particular issue or problem that has been identified as being related to the originally detected anomaly. In some embodiments, the microservice software package may be stored in a remote computing device (e.g., a server) that is accessible to customers (e.g., operators of the industrial automation system 10, factory 12, or factories 14) with certain agreements (e.g., purchase agreement for the add-on microservice), such that they may be downloaded by the appropriate computing device or controller.

Figure 15:
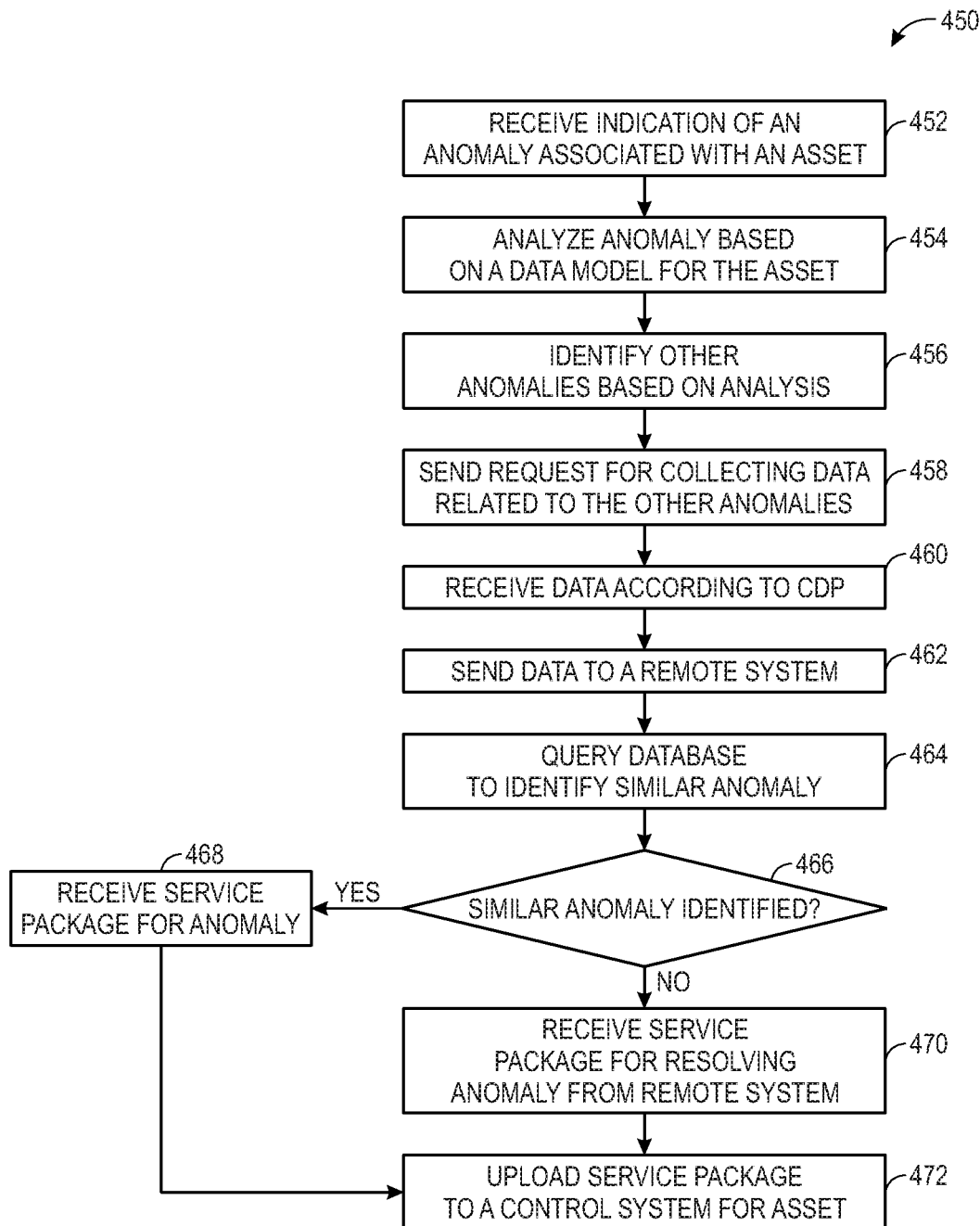
FIG. 15 illustrates a flow chart of a process for providing add-on microservices through the asset management system 150 of FIG. 9, in accordance with an embodiment presented herein.

Keeping the foregoing in mind, FIG. 15 illustrates a flow chart of a process 450 for providing add-on microservice solutions through the asset management system 150 of FIG. 9. The process 450 may be a process that one or more processors included in the asset management system 150 implements by executing computer-readable instructions stored on memory or storage included in, or accessible to, the asset management system 150. It should be noted that the operations described below with regard to the process 450 are exemplary operations and that, in other embodiments, the process 450 may include additional operations or omit one or more operations illustrated in FIG. 15. Additionally, in some embodiments, the operations of the process 450 may be performed in an order different than the order discussed below.

At process block 452, the asset management system 150 may receive an indication of an anomaly associated with an asset (e.g., asset 154) from a Digital Twin (e.g., Digital Twin 174). In some embodiments, the Digital Twin 174 may actively monitor and simulate operations of the asset 154. Through the operation monitoring, the Digital Twin 174 may detect an anomaly (e.g., certain behavior that deviates from normal or expected behavior) associated with the asset 154. The indication of the detected anomaly may then be sent to the asset management system 150, which may automatically notify the field technician regarding the detected anomaly via an electronic notification or message.

In response to receiving the indication of the detected anomaly, the asset management system 150 may access the code repository system 166 to create a data model for assessing or troubleshooting the detected anomaly for the asset 154 associated with the Digital Twin 174. The asset management system 150 may then analyze the anomaly based on the data model for the asset 154 (process block 454). For example, the detected anomaly and relevant data (e.g., performance data 212) may be compared to historical records related to the asset 154, as indicated in the data model. In some embodiments, an asset hierarchy may be used to determine other assets that are operationally related to the asset 154.

The asset management system 150 may also identify other anomalies based on the analysis of the anomaly in view of the data model (process block 456). For example, the asset management system 150 may access other Digital Twins associated with other assets operationally related to the asset 154 to identify additional anomalies (e.g., anomalies occurred in a same time window as the detected anomaly associated with the assets 154). Such anomalies may provide insight into a root cause of the detected anomaly.

After identifying the other anomalies, the asset management system 150 may send a request for collecting data related to the other anomalies (process block 458) to other control systems associated with the other assets. For example, the request may be sent to the edge devices 156 communicatively connected to the other assets associated with the identified anomalies. In some embodiments, after identifying the appropriate edge devices 156, the field technician may configure the edge devices 156 to enable certain connected microservices for collecting and transmit asset data through the common data pipeline, as described above with respect to the microservices 402.

At process block 460, the asset management system 150 may receive data via the common data pipeline associated with the asset that corresponds to the originally detected anomaly, as well as data associated with the other assets that corresponds to the other identified anomalies. The received data may include the asset data (e.g., the application data 208, service data 210, and performance data 212) collected and transmitted through the common data pipeline as discussed in detail in process blocks 408-416.

In some embodiments, the asset management system 150 may send the data received via the common data pipeline to a remote system (process block 462). In this way, the received data may be the sent to the remote support system 162 that may utilize the received data for troubleshooting and/or diagnosis. For example, the field technician may remotely access the remote support system 162 to utilize the data models associated with the Digital Twin 174 corresponding to the asset 154 and other Digital Twins corresponding to the other assets associated with the other identified anomalies to analyze received data, coordinate with the simulation system 170 to run simulations or diagnosis for the anomalies based on received data, and update corresponding operational parameters, code, or OT firmware to enable appropriate solutions to the anomalies. In some embodiments, the field technician may remotely access multiple Digital Twins that may be related to identified anomalies and combine multiple simulations of the Digital Twins 174 into a large simulation for enhanced analysis and diagnosis.

In some embodiments, in addition to or in lieu of causing a remote system (e.g., remote support system 162) to analyze received data, run simulations or diagnosis, and enable solutions to the identified anomalies, the asset management system 150 may query databases to identify similar anomaly or anomalies (process block 464). For example, queries may be based on the product data 204 associated with the asset 154, such as manufacture data (e.g., model and serial number), lab test data, software data (e.g., initial OT firmware), and other data related to manufacturing of the assets 154. The asset management system 150 may query the databases 218 and 214 to search data records associated with the assets that have same model number as the asset 154. Such data records may indicate similar anomalies identified in the past and may include solutions corresponding to the identified anomalies. In some embodiments, machine learning algorithms may be used to facilitate identifying similar anomalies during querying the databases 218 and 214.

At decision block 466, the asset management system 150 may determine whether a similar anomaly has been identified during the query. If a similar anomaly has been identified, the asset management system 150 may retrieve a service package containing microservice solutions for the issues related to the anomaly (process block 468). For example, the service package may include operational parameters, code, or OT firmware that may be stored in the code repository system 166 and may adjust operations of the asset to resolve the anomaly.

At process block 472, the asset management system 150 may upload one or more service packages to one or more control systems associated with one or more assets as an add-on microservice solutions. As such, the operations or configuration of the asset may be modified to resolve or alleviate conditions that may be causing the anomalies. In some embodiments, the service packages may also be sent to a remote server may be part of the industrial network 152 or remotely located outside the industrial network 152 (e.g., operated by a third-party). The remote server may be accessible to customers (e.g., operators of the industrial automation system 10, factory 12, or factories 14) with certain agreements (e.g., purchase agreement for the add-on microservice solution), such that similar assets may retrieve the service packages in anticipation of the anomaly or in response to detecting the same anomaly.

If no similar anomaly has been identified, the asset management system 150 may receive a new service package for resolving the anomaly from the field technician, the remote system (process block 470), or the like. That is, the anomaly may be troubleshot and analyzed to determine causes for the anomaly. Referring back to process block 462, the relevant data associated with the anomalies may be analyzed by users with access to the remote system. As such, experts or technical agents may analyze the data received via the common data pipeline as if they were present with physical access to the asset. In addition, since the data is provided according to the common data pipeline, the data may be analyzed in an efficient manner due to the aggregation and alignment techniques described above. After determining a service package that may resolve the detected anomalies, the remote system may send the service package such that the asset management system 150 may receive the service package at block 470. After receiving the service package, the asset management system 150 may upload the service package to the respective control system (process block 472) for the asset, such that the service package may modify the configuration or operations of the respective asset(s).

As described above, various data infrastructures, data security systems, and data services are provided to ensure a cybersecurity in the industrial automation system 10 and the asset management system 150. Such data infrastructures, data security systems, and data services include the common data pipeline, the cybersecurity system 168, the connected microservices, and so on. As a part of an industrial information solution, the cybersecurity provides protections for hardware, software, and data from various cyber-threats such as data breaches, data theft, and unauthorized access, which may disrupt or misdirect operations of the industrial automation system 10 and the asset management system 150. Techniques with regard to the cybersecurity may include automatically collecting log data (e.g., log files) in response to detecting cybersecurity threats or any relevant alert. Such automatic log data collection and cybersecurity threat detection may be included in cybersecurity microservices described in more detail below with reference to FIG. 16. For example, a cybersecurity expert performing onsite cybersecurity-related tasks may configure an edge device (e.g., edge computing device 86) to enable the automatic log data collection and cybersecurity threat detection. The cybersecurity expert may remotely (e.g., via the industrial network 152) access the cybersecurity system 168 to run simulations to predict the detected threats or alerts for various assets (e.g., the asset 154) based on the code stored in the code repository system 166 and further tune or train the cybersecurity system 168 to detect other potential cybersecurity issues.

Figure 16:
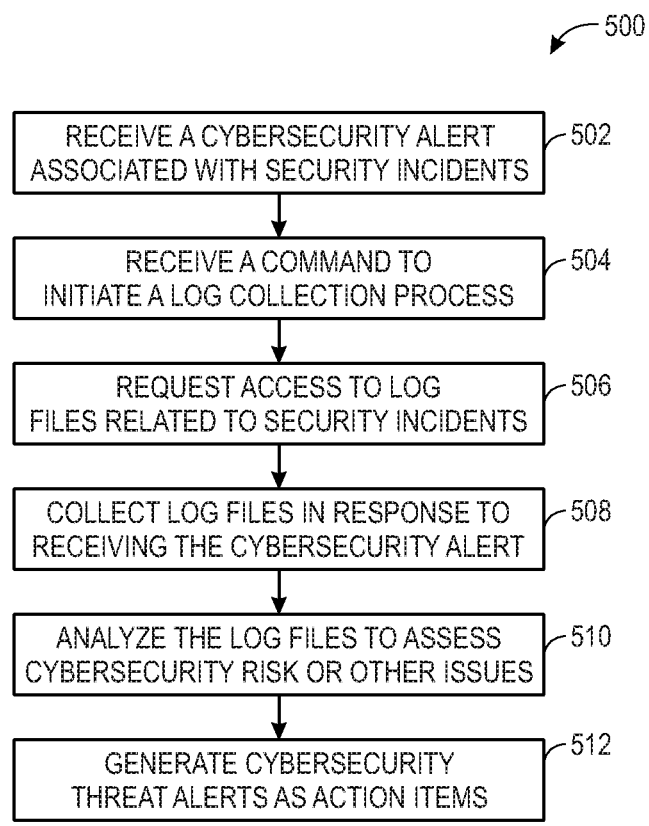
FIG. 16 illustrates a flow chart of a process for providing cybersecurity microservices through the asset management system of FIG. 9, in accordance with an embodiment presented herein.

Keeping the foregoing in mind, FIG. 16 illustrates a flow chart of a process 500 for providing cybersecurity microservices through the asset management system 150 of FIG. 9. The process 500 may be a process that one or more processors included in the asset management system 150 implement by executing computer-readable instructions stored on memory or storage included in, or accessible to, the asset management system 150. It should be noted that the operations described below with regard to the process 500 are exemplary operations and that, in other embodiments, the process 500 may include additional operations or omit one or more operations illustrated in FIG. 16. Additionally, in some embodiments, the operations of the process 500 may be performed in an order different than the order discussed below.

At process block 502, the cybersecurity system 168 may receive a cybersecurity alert associated with security incidents. The cybersecurity alert may be generated by a computing device used by a field technician during onsite routine tasks (e.g., maintenance) or troubleshooting/diagnostic tasks related to certain anomalies or issues identified by the Digital Twin 174 monitoring the asset 154 (e.g., by checking the security data 238). The security incidents may be related to potential or occurring cybersecurity threats such as hacking attempts, data breaches, malware, phishing, denial of service attack, attacks on IoT devices, man-in-the-middle attacks, Domain Name System (DNS) tunneling, SQL injection, and the like. In some embodiments, the cybersecurity system 168 may transfer the received cybersecurity alert to a user device (e.g., the client device 160).

In response to receiving the cybersecurity alert, the cybersecurity system 168 may receive a command to initiate a log file collection process (process block 504). In one embodiment, the command may be automatically generated by the cybersecurity system 168. In another embodiment, the command may be generated by the client device 160.

In some cases, the total amount of log files that is available for analysis may be overwhelming. To effectively analyze the log files, a subset of the collected log files may be identified and then the subset of the log file will be analyzed to assess the cybersecurity risk or any other issue. As such, the cybersecurity alert to initiate the log collection process for some period of time, thereby, thereby reducing the amount of log files to be analyzed. In addition, by using the cybersecurity alert to trigger the collection of log files, the amount of log files to be stored may be reduced. In some embodiments, the cybersecurity alert that triggers the collection of log files may be an anomaly alert that is generated when a certain anomaly in the data collection, the payload data, or other aspect of the data is detected. In some embodiments, edge devices (e.g., edge device 156) may be used to detect the anomalies and distribute the commands to the systems generating log files.

At process block 506, the cybersecurity system 168 may request access to log files related to the security incidents. For example, the log files may be stored in the database 218 with certain access protections, which may be stored in the security data 238 accessible to the Digital Twin 174. The cybersecurity system 168 may send a request to the code repository system 166 for access the Digital Twin 174 that stores the security data 238 in the database 244. The code repository system 166 may request identity information from the cybersecurity system 168 or utilize identity information included in the received request to determine whether to provide the cybersecurity system 168 access to the Digital Twin 174. In some embodiments, a portion of the log files may be stored in the client device 160 associated with a user account. The cybersecurity system 168 may query a database (e.g., database attached to the cybersecurity system 168) for data indicating the user account.

After receiving permission for access, the cybersecurity system 168 may collect log files in response to receiving the cybersecurity alert (process block 508). The log files may be collected from relevant systems (e.g., the industrial control system 22) and devices (e.g., edge computing device 86, cloud computing device 88, computing device 90). The relevant systems and devices may be distributed among a number of organizations. Each of the collected log file may include a list of events (e.g., security incidents) that occur in an operating system of software and corresponding reactions of the operating system in response to the events.

The cybersecurity system 168 may analyze the log files to assess cybersecurity risk or other issues (process block 510). In some embodiments, emulations may be used to test how the cybersecurity risk or other issues are assessed and resolved in different organizations. For example, the cybersecurity system 168 may request the simulation system 170 to run simulations in a cloud environment based on the security incidents and corresponding reactions recorded in the log files collected from different organizations. In another embodiment, the cybersecurity system 168 may coordinate with the code repository system 166 to request the simulation system 170 to run simulations based on the security incidents and the code 234 corresponding to the asset 154.

In some embodiments, with regard to analyzing the log files after receiving the cybersecurity alert, the lack of knowledge of the events occurring prior to the cybersecurity alert being generated may prevent the cybersecurity system 168 from comprehensively analyzing the alert. That is, the events that occur prior to the cybersecurity alert being generated may provide insight into the root cause of the alert. With this in mind, in some embodiments, the log files may be stored in a cache or storage component at regular intervals, and upon receipt of the cybersecurity alert, the log files that are acquired after the cybersecurity alert, as well as the log files stored in the cache, may be transmitted for analysis. The cache process may be coordinated across different components that may be connected to a respective component, such that the cached data for each component corresponds to the same time frame.

Based on the analytic results from assessing the cybersecurity risk or other issues, the cybersecurity system 168 may generate cybersecurity threat alerts as actionable items (process block 512). The cybersecurity threat alert may provide information with regard to conditions or data indicating a cybersecurity threat is present. However, instead of just an informative alert, alerts that provide action items, such as isolating network traffic to a particular device or enabling a cybersecurity expert to isolate relevant networks and take actions against malicious cyber attacks, may enable more effective solutions or tools to contain cybersecurity threats. In some embodiments, the cybersecurity threat alert may be automatically sent to a computing device (e.g., the client device 160) to generate a visualization or audbile notification to notify a user of the computing device.

In some embodiments, the cybersecurity system 168 may use Operational Technology (OT) data (e.g., OT data 240) to determine if any cybersecurity alerts or issues are related to the OT data. Relevant OT data may include audit history, changes that were made to the operations of components, and the like. By way of example, the log files may include SQL logs, Windows event logs, telemetry data from switches, and the like.

In addition to collecting log files, the cybersecurity system 168 may use machine learning algorithms to track the log files to generate a model. The model may enable the cybersecurity system 168 to predict that a cybersecurity threat is likely to occur. In some embodiments, the model may be used to track the operations that were performed to resolve the cybersecurity threat. As such, the cybersecurity system 168 may automatically take steps (e.g., isolate data sources) to protect the industrial automation system 10 and the asset management system 150 from additional operation time or data exposure. In some embodiments, a playbook or guide may be transmitted to a user (e.g., a technician or an appropriate party) to guide the user of the industrial automation system 10 or the asset management system 150 with regard to resolving the cybersecurity threat. As such, the machine learning algorithm may use data provided (e.g., log files) as input or training data to use for future operations.

As mentioned previously, the asset management system 150 may use the Digital Twins 174 to coordinate with the simulation system 170 to test OT firmware (e.g., OT firmware 176) updates in an emulation environment to ensure that assets 154 will operate in accordance to desired output parameters. The OT firmware updates (e.g., software patches) may be provided to various devices (e.g., the assets 154) at regular or irregular time intervals. In some cases, the firmware updates may cause the assets 154 to operate inefficiently. That is, a firmware update provided to one OT component may cause another OT component to stop operating, lose connectivity, or the like. As such, in certain embodiments, OT firmware updates may be tested in a simulated software environment to determine the compatibility of the OT component being updated with the other OT components, determine an impact on an overall system level, and the like. In this way, the asset management system 150 may perform an OT firmware risk assessment without actually performing the update on physical components (e.g., components of the assets 154) that control physical processes. In some embodiments, testing the OT firmware updates is included in the connected microservices described previously. For example, the asset management system 150 may include one or more receiving devices (e.g., cloud computing device 88) to provide the connected microservices including the OT firmware testing.

In some embodiments, the asset management system 150 may utilize emulation environment to identify OT components eligible for direct replacements in view of the OT firmware updates. That is, the directly replaceable OT components may be identified as having no relationship to the aspects of the OT firmware updates being pushed to the assets 154. As such, these OT components may be replaced without concern regarding compatibility issues or attributes with the OT firmware updates.

In some embodiments, the asset management system 150 may use a risk assessment tool to generate notifications and/or visualizations that illustrate the impact of the OT firmware update to the overall system effectiveness, a list of risks associated with pushing the OT firmware update across the components, a list of risks with regard to cybersecurity if the OT firmware updates are not implemented, and the like. For example, the risks associated with an OT firmware update that affects four components may be relatively less than risks associated with a firmware update that affects 25 components. The risk assessment tool may categorize or characterize the cybersecurity threat with respect to a contextual hierarchy or a network design to help a user to understand the threat.

Figure 17:
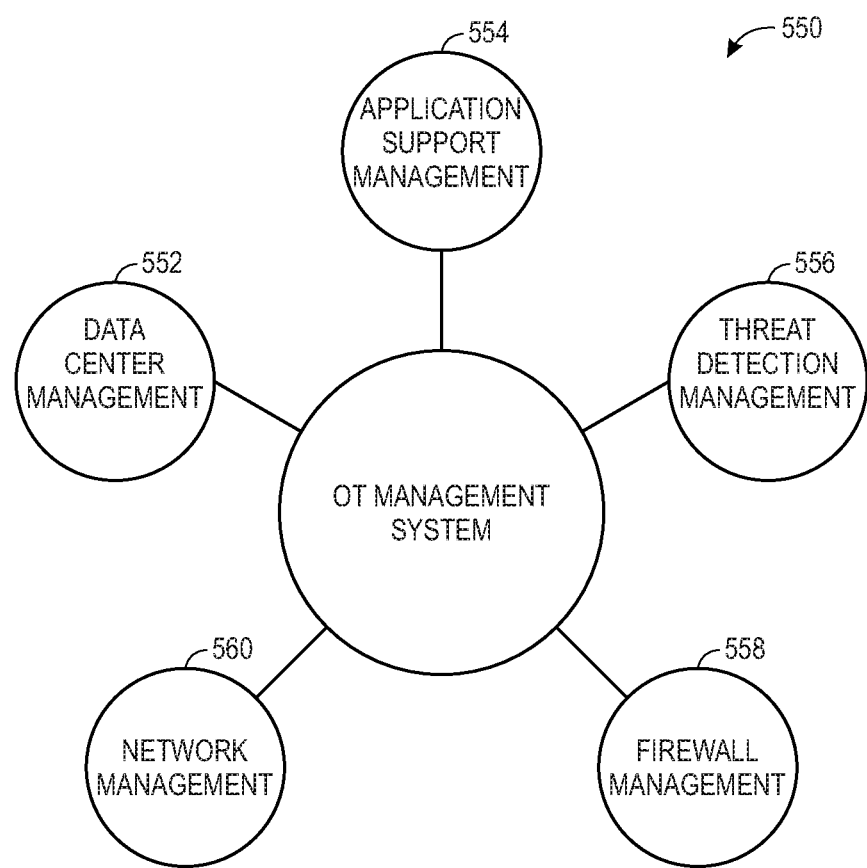
FIG. 17 illustrates a block diagram of an example Operation Technology (OT) management system that may be employed in the asset management system of FIG. 9, in accordance with an embodiment presented herein.

FIG. 17 illustrates a block diagram of an example Operation Technology (OT) management system 550 that may be employed in the asset management system 150 of FIG. 9. The OT firmware updates and emulation described above may be provided with respect to a number of different components included in the OT management system 550. It should be noted that the components described below with regard to the OT management system 550 are exemplary areas and that, in other embodiments, the OT management system 550 may include additional components or omit one or more components illustrated in FIG. 17.

The OT management system 550 may include a data center management component 552 and an application support management component 554. The data center management component 552 may provide remote monitoring and administration of data center assets employed in data centers that may support operations of the industrial automation system 10. Additionally, the data center management component 552 may provide services related to the OT firmware warranty and patches associated with the data center assets. The application support management component 554 may provide remote support and administration for application assets (e.g., assets 154). Additionally, the application support management component 554 may provide services related to the OT firmware warranty and patches associated with the application assets. In some embodiments, the application support management component 554 may share resources (e.g., computing devices, software, storage) with the remote support system 162 described previously.

The OT management system 550 may also include a threat detection management component 556 and a firewall management component 558. The threat detection management component 556 may provide remote management of computing appliances on which threat detection software is deployed. For example, the computing appliances may include the edge computing device 86, the cloud computing device 88, and/or the computing device 90. The firewall management component 558 may provide remote monitoring and administration of firewall appliances. For example, the firewall appliances may include network routers and/or switches that may be located at the edge 158. In some embodiments, the threat detection management component 556 and firewall management component 558 may share resources (e.g., computing devices, software, storage) with the cybersecurity system 168 described previously.

The OT management system 550 may further include a network management component 560 to provide remote monitoring and administration of network environment assets. For example, the network environment assets may include network routers and/or switches that may be located inside the industrial automation system 10, at the edge 158, and inside the industrial network 152. Additionally, the network management component 560 may provide services related to the OT firmware and firmware warranty associated with the network environment assets.

The technologies described in the disclosed embodiments include an industrial automation network that may include an asset management system to remotely monitor, control, support, and maintain operations of a variety of assets. The asset management system may create a number of Digital Twins each representing a corresponding asset in the industrial automation network. The asset management system may enable users to utilize the Digital Twins to remotely monitor, control, support, and maintain the operations of the corresponding assets. In some cases, the asset management system may allow a user to have access to certain code and firmware associated with an asset that may have issues or errors. The user may use accessed code to identify an existing Digital Twin that has been assigned to the asset or to create a Digital Twin and assign the Digital Twin to the asset. The client may use/supervise the Digital Twin to analyze collected asset-related data, conduct simulations using a simulator coordinated with the Digital Twin, run diagnostics on and/or troubleshoot the asset-related data to determine one or more causes of respective issues or errors, and update the code to enable appropriate solutions to the issues and errors.

In addition, the industrial automation network may use certain electronic devices to enable microservices to facilitate data transmissions and improve data security. The industrial automation network may enable connected microservices using certain edge devices and receiving devices to facilitate data transmissions associated with the asset-related data and add enhanced protections to improve data security during data transmissions. The connected microservices may include automatically collecting log data (e.g., log files) in response to detecting cybersecurity threats or any relevant alert and running simulations to predict the detected cybersecurity threats or alerts for various assets based on certain code and firmware associated with the assets.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A non-transitory computer-readable medium comprising instructions that, when executed, cause one or more processors to:
   receive a first request to access a digital representation of a plurality of digital representations corresponding to a plurality of assets stored in a code repository from a computing device, wherein the digital representation is created using updated model code associated with a first hierarchy comprising hierarchical levels of the code repository, wherein the updated model code is generated based on reference code converted from asset code associated with a second hierarchy comprising hierarchical levels of the plurality of assets based on a mapping between the second hierarchy and the first hierarchy, wherein the digital representation is assigned to an asset of the plurality of assets of an industrial automation system, and wherein the digital representation comprises code specific to operating, maintaining, or diagnosing the asset;
   verify a security access for the first request based on identity information associated with a user of the computing device included in the first request to determine whether to provide the computing device access to the digital representation;
   provide the computing device access to the digital representation in response to verifying the security access;
   receive an input to modify the code from the computing device;
   perform one or more simulations of the modified code utilizing the digital representation in response to receiving the input to modify the code;
   send one or more simulation results to the computing device for evaluations based on the one or more simulations;
   receive, from the computing device, a second request for pushing the modified code to the asset; and
   cause the modified code to be sent to the asset in response to receiving the second request.

2. The non-transitory computer-readable medium of claim 1, wherein the computing device is configured to access a control system of the industrial automation system to resolve or diagnose problems associated with the asset.

3. The non-transitory computer-readable medium of claim 1, wherein:

the security access enables the computing device to access at least a portion of the asset code stored in the code repository, wherein the asset code comprises a hierarchical level of the asset within the industrial automation system; and the computing device is permitted to temporarily access and modify the portion of the asset code.

4. The non-transitory computer-readable medium of claim 1, wherein the code comprises code running environment and settings and code testing environment and conditions.

5. The non-transitory computer-readable medium of claim 1, wherein the simulation results comprise one or more errors, alerts, or recommendations, generated based on the one or more simulations.

6. A simulation system, comprising one or more processors configured to:

simulate a performance of each asset of a plurality of assets in a computational environment by running one or more simulations of a performance of each asset of the plurality of assets using a plurality of digital representations corresponding to the plurality of assets stored in a code repository, wherein each of the plurality of digital representations is created using updated model code associated with a first hierarchy comprising hierarchical levels of the code repository, wherein the updated model code is created based on reference code converted from asset code associated with a second hierarchy comprising hierarchical levels of the plurality of assets based on a mapping between the second hierarchy and the first hierarchy, wherein the code repository comprises:

a plurality of portions of computer-executable code, wherein each portion of the plurality of portions of computer-executable code is used to operate a respective asset of the plurality of assets, wherein each of the plurality of digital representations represents the respective asset of the plurality of assets in the computational environment, and wherein each of the plurality of digital representations is generated based on a respective portion of the plurality of portions of computer-executable code associated with the respective asset of the plurality of assets;

generate one or more updated portions that correspond to one or more of the plurality of portions of computer-executable code based on the one or more simulations; and send the one or more updated portions to one or more assets of the plurality of assets associated with the one or more of the plurality of portions of computer-executable code.

7. The simulation system of claim 6, wherein the one or more processors are configured to receive data indicative of a plurality of identities for the plurality of assets, a plurality of operations performed by the plurality of assets, or both via a plurality of routers configured to control data flow of the data, wherein the plurality of routers is configured to communicatively couple to one or more control systems communicatively, wherein the one or more control systems are configured to control and operate the plurality of assets.

8. The simulation system of claim 6, wherein the one or more processors are configured to:

receive data indicative of a plurality of identities for the plurality of assets, a plurality of operations performed by the plurality of assets, or both; and analyze at least a portion of the data to detect a cybersecurity threat to the plurality of assets.

9. The simulation system of claim 8, wherein the one or more processors are configured to detect the cybersecurity threat based on the one or more simulations.

10. The simulation system of claim 6, wherein the one or more processors are configured to record the one or more updated portions of the plurality of portions of computer-executable code in the code repository via one or more log files, one or more ledgers, one or more blockchains, or any combination thereof.

11. The simulation system of claim 6, wherein the one or more processors are configured to provide a computing device access to a first digital representation of the plurality of digital representations to remotely control operations of an asset of the plurality of assets corresponding to the first digital representation.

12. The simulation system of claim 11, wherein the one or more processors are configured to create a temporary permission for the computing device to access the computer-executable code.

13. The simulation system of claim 6, wherein the one or more processors are configured to generate and update each of the plurality of digital representations using hierarchical data associated with the respective asset of the plurality of assets, wherein the hierarchical data comprises hierarchical levels of hardware implemented in the plurality of assets.

14. The simulation system of claim 6, wherein the one or more processors are configured to generate the respective portion of the plurality of portions of computer-executable code based on model code stored in the code repository and asset code stored in the respective asset of the plurality of assets.

15. A method, comprising:

receiving, via a processor, a first request for creating a digital representation for an asset in a code repository system of an industrial automation control system, wherein the request is received from a computing device;

retrieving, via the processor, model code for the asset from the code repository system in response to receiving the first request, wherein the model code is associated with a first hierarchy that comprises a plurality of hierarchical levels of a plurality of digital representations corresponding to a plurality of assets of an industrial automation system, wherein the plurality of assets comprises the asset;

sending, via the processor, a second request for asset code to the asset, wherein the asset code is associated with a second hierarchy that comprises a plurality of hierarchical levels of the plurality of assets within the industrial automation system;

receiving, via the processor, the asset code from the asset;

determining, via the processor, a mapping between the second hierarchy and the first hierarchy;

converting, via the processor, the asset code to a reference code based on the mapping;

generating, via the processor, an updated model code based on the reference code; and creating, via the processor, the digital representation based on the updated model code.

16. The method of claim 15, wherein the model code comprises template code specific to a type of asset or a group of assets that corresponds to the asset.

17. The method of claim 15, wherein the processor utilizes the first hierarchy to track, search, and query the model code in the code repository system.

18. The method of claim 15, wherein the asset code comprises input information from the computing device, and wherein the input information comprises environmental settings and conditions for running and testing the asset code.

19. The method of claim 15, wherein the mapping between the second hierarchy and the first hierarchy is determined based on a first set of metadata associated with the asset and a second set of metadata associated with the digital representation.

20. The method of claim 19, wherein the first set of metadata associated with the asset comprises modification information of the second hierarchy.

* * * * *